(12) United States Patent
Scott et al.

(10) Patent No.: US 8,200,561 B1
(45) Date of Patent: Jun. 12, 2012

(54) TAX-AWARE ASSET ALLOCATION

(75) Inventors: Jason Scott, Los Altos, CA (US);
Joshua David Schwab, San Francisco, CA (US); John G. Watson, Menlo Park, CA (US); Wei-Yin Hu, Menlo Park, CA (US); James William Shearer, San Francisco, CA (US)

(73) Assignee: Financial Engines, Inc., Palo Alto, CA (US)

( * ) Notice: Subject to any disclaimer, the term of this patent is extended or adjusted under 35 U.S.C. 154(b) by 1980 days.

(21) Appl. No.: 10/404,818

(22) Filed: Mar. 31, 2003

Related U.S. Application Data

(60) Provisional application No. 60/368,624, filed on Mar. 29, 2002.

(51) Int. Cl.
*G06Q 40/00* (2006.01)
(52) U.S. Cl. ..................... 705/36 T; 705/36 R
(58) Field of Classification Search ............... 705/35–40
See application file for complete search history.

(56) References Cited

U.S. PATENT DOCUMENTS

| | | | |
|---|---|---|---|
| 3,634,669 A | 1/1972 | Soumas et al. |
| 3,697,693 A | 10/1972 | Deschenes et al. |
| 4,007,355 A | 2/1977 | Moreno |
| 4,334,270 A | 6/1982 | Towers |
| 4,346,442 A | 8/1982 | Musmanno |
| 4,376,978 A | 3/1983 | Musmanno |
| 4,597,046 A | 6/1986 | Musmanno et al. |
| 4,642,767 A | 2/1987 | Lerner |
| 4,648,037 A | 3/1987 | Valentino |
| 4,722,055 A | 1/1988 | Roberts |
| 4,742,457 A | 5/1988 | Leon et al. |
| 4,752,877 A | 6/1988 | Roberts et al. |
| 4,774,663 A | 9/1988 | Musmanno et al. |
| 4,868,376 A | 9/1989 | Lessin et al. |
| 4,876,648 A | 10/1989 | Lloyd |
| 4,885,685 A | 12/1989 | Wolfberg et al. |

(Continued)

FOREIGN PATENT DOCUMENTS

CA 2309853 A1 * 11/2001
(Continued)

OTHER PUBLICATIONS

Department of the Treasury, Internal Revenue Service"Mutual Fund Distributions"2000.*

(Continued)

*Primary Examiner* — Thomas M Hammond, III
(74) *Attorney, Agent, or Firm* — Hamilton, DeSanctis & Cha LLP

(57) ABSTRACT

A method of tax-aware asset allocation is provided. According to one embodiment, information is received regarding financial products available for investment in a taxable account and a tax deferred account of an investor. Information is also received regarding current investments held in the taxable account and the tax deferred account. Tax characteristics associated with each financial product is determined by evaluating information regarding distributions and/or information regarding turnover. Relevant financial circumstances of the investor are also determined. Finally, advice is formulated regarding a recommended portfolio of financial products, including a recommendation regarding which of the taxable account and the tax deferred account each financial product in the recommended portfolio should be held by performing a portfolio optimization process that takes into consideration the tax characteristics, the relevant financial circumstances, and tax implications of holding the financial products in the taxable account versus the tax deferred account.

44 Claims, 7 Drawing Sheets

U.S. PATENT DOCUMENTS

| | | | |
|---|---|---|---|
| 4,910,676 A | 3/1990 | Alldredge | |
| 4,933,842 A | 6/1990 | Durbin et al. | |
| 4,953,085 A | 8/1990 | Atkins | |
| 4,989,141 A | 1/1991 | Lyons et al. | |
| 5,025,138 A | 6/1991 | Cuervo | |
| 5,101,353 A | 3/1992 | Lupien et al. | |
| 5,126,936 A | 6/1992 | Champion et al. | |
| 5,132,899 A | 7/1992 | Fox | |
| 5,148,365 A | 9/1992 | Dembo | |
| 5,220,500 A | 6/1993 | Baird et al. | |
| 5,222,019 A | 6/1993 | Yoshino et al. | |
| 5,227,967 A | 7/1993 | Bailey | |
| 5,237,500 A | 8/1993 | Perg et al. | |
| 5,454,104 A | 9/1995 | Steidlmayer et al. | |
| 5,471,575 A | 11/1995 | Giansante | |
| 5,523,942 A | 6/1996 | Tyler et al. | |
| 5,553,212 A | 9/1996 | Etoh | |
| 5,563,783 A | 10/1996 | Stolfo et al. | |
| 5,590,037 A | 12/1996 | Ryan et al. | |
| 5,592,379 A | 1/1997 | Finfrock et al. | |
| 5,644,727 A | 7/1997 | Atkins | |
| 5,692,233 A | 11/1997 | Garman | |
| 5,784,696 A | 7/1998 | Melnikoff | |
| 5,799,287 A | 8/1998 | Dembo | |
| 5,806,049 A | 9/1998 | Petruzzi | |
| 5,812,987 A | 9/1998 | Luskin et al. | |
| 5,819,238 A | 10/1998 | Fernholz | |
| 5,839,804 A | 11/1998 | Ho | |
| 5,864,827 A | 1/1999 | Wilson | |
| 5,864,828 A | 1/1999 | Atkins | |
| 5,875,437 A | 2/1999 | Atkins | |
| 5,884,283 A | 3/1999 | Manos | |
| 5,884,285 A | 3/1999 | Atkins | |
| 5,884,287 A | 3/1999 | Edesess | |
| 5,907,801 A | 5/1999 | Albert | |
| 5,911,135 A | 6/1999 | Atkins | |
| 5,911,136 A | 6/1999 | Atkins | |
| 5,913,202 A | 6/1999 | Motoyama | |
| 5,918,217 A | 6/1999 | Maggioncalda et al. | |
| 5,918,218 A | 6/1999 | Harris | |
| 5,930,774 A | 7/1999 | Chennault | |
| 5,930,775 A | 7/1999 | McCauley et al. | |
| 5,933,815 A | 8/1999 | Golden | |
| 5,978,778 A | 11/1999 | Oshaughnessy | |
| 5,987,433 A | 11/1999 | Crapo | |
| 5,987,434 A | 11/1999 | Libman | |
| 5,991,744 A | 11/1999 | DiCresce | |
| 5,999,918 A | 12/1999 | Williams et al. | |
| 6,003,018 A | 12/1999 | Michaud et al. | |
| 6,012,042 A | 1/2000 | Black et al. | |
| 6,012,043 A | 1/2000 | Albright et al. | |
| 6,012,044 A | 1/2000 | Maggioncalda | |
| 6,018,722 A | 1/2000 | Ray et al. | |
| 6,021,397 A | 2/2000 | Jones et al. | |
| 6,078,904 A | 6/2000 | Rebane | |
| 6,125,355 A | 9/2000 | Bekaert | |
| 6,154,732 A | 11/2000 | Tarbox | |
| 6,240,399 B1 * | 5/2001 | Frank et al. | 705/36 R |
| 6,275,814 B1 | 8/2001 | Giansante | |
| 6,292,787 B1 | 9/2001 | Scott | |
| 6,496,741 B1 | 12/2002 | Whiffen | |
| 6,601,044 B1 | 7/2003 | Wallmain | |
| 6,687,681 B1 * | 2/2004 | Schulz et al. | 705/36 T |
| 7,016,873 B1 | 3/2006 | Peterson et al. | |

FOREIGN PATENT DOCUMENTS

| | | |
|---|---|---|
| EP | 0572281 A1 | 12/1993 |
| GB | 2306713 | 7/1997 |
| JP | 04-193658 | 7/1992 |
| JP | 04193658 | 7/1992 |
| JP | 05-177511 | 6/1993 |
| JP | 05177511 | 6/1993 |
| JP | 05-081202 | 8/1993 |
| JP | 05081202 | 8/1993 |
| WO | 9102326 | 2/1991 |
| WO | 9606402 | 2/1996 |
| WO | 9813776 | 4/1998 |
| WO | 9844444 | 10/1998 |
| WO | 9854666 | 12/1998 |
| WO | 9905625 | 2/1999 |
| WO | 9915985 | 4/1999 |
| WO | 9922323 | 5/1999 |
| WO | 0105793 | 7/2001 |

OTHER PUBLICATIONS

Anonymous, "Interactive Software Eases 401 (k) Planning." Bank Marketing, V26, No. 10, 1994; p. 56.

Author Unknown, "Interactive Variable Control During Visualization of Mathematical Functions." IBM Technical Disclosure Bulletin. vol. 34. No. 9. 1992; pp. 288/289.

Author Unknown, "Microsoft Excel 97 Intermediate." Cheltenham Computer Training 1995-2001. www.cctglobal.com. pp. 26-30.

Bowers, N. L., "Actuarial Mathematics." The Society of Actuaries. 1986; pp. 52-59.

Carhart, M., "On Persistence in Mutual Fund Performance." The Journal of Finance. vol. 52. No. 1. 1997; pp. 57-82.

Kariya, T., "Elements of Financial Science." Toyo Keizai Shimpo, K.K., Sep. 25, 1997, pp. 71-101 (Chapter 5) and pp. 117-133 (Chapter 7).

Murray, G.W. et al., "Practical Optimization." Academic Press. Chapter 5. 1981.

Sharpe, W.F., "AAT Asset Allocation Tools." The Scientific Press, 1985. pp. 84-85; pp. 93-96.

Society of Actuaries, "1994 Group Annuity Mortality Table and 1994 Group Annuity Reserving Table." vol. 47. pp. 865-913.

Sharpe, W.F. "Asset Allocation: Management Style and Performance Measurement", The Journal of Portfolio Management, Winter, 1992, vol. 18, Num. 2, pp. 1-14.

Anonymous, "Keeping Up With Technology: The 1991 Software Update" Trusts & Estates, pp. 34-67, Jun. 1991.

Hickox, F. "Information Technology, Learning About Artificial Intelligence", Institutional Investor, pp. 209-210, Jul. 1986.

Wiener, Daniel P. "Software Packages for Investors", Fortune/1987 Investors Guide, pp. 185-188.

Lichtman, P., "Software: The Professional Plan", Lotus, Nov. 1986, pp. 121 and 140.

Paroush, J., "Risk and Wealth Effects on Efficient Portfolio", Metroeconomics, vol. 26, No. 1-3, pp. 86-96, 1974.

Science & Technology, "A Financial Planner with Nerves of Silicon", Business Week, Oct. 7, 1985, 3 pages.

"The Benefits of the New Compatibility" Personal Computing, May 1986, 3 pages.

Woodwell, Donald R., "Automating Your Financial Portfolio", Second Edition, Dow Jones-Irwin, 1986.

The Funds Management Group, Inc., "Funds Allocation System", Software Update, pp. 1-9, No Date.

FPS/Optimum, "The Extended Analysis Language for All Users", pp. 1-2 1986.

Fersko-Weiss, Henry, "Dialing for Profits, Managing the Market", Product Review, No Date.

Sharpe, W.F., et al., "Investments", Fifth Edition, Chapter 8, pp. 193-231, Chapter 11, pp. 293-321, Chapter 23, pp. 827-863, 1995.

"Barra Provides Combined Style Analysis and Asset Allocation Capabilities", downloaded from website http://www.barra.com, in July of 1998.

"EnCorr Products and Services", downloaded from website http://www.ibbotson.com, in July of 1998.

"Net Results", Investment Strategies Network, Inc., 1995, 1996, 1997, 97 pages.

IFPS/Optimum, "The Extended Analysis Language for All Users", Execucom Systems Corporation, 1986, 4 pages.

"Net Results TM, Your On-Line Financial Advisor", downloaded from website http://www.isnetwork.com, in December of 1997.

Voros, J. "Portfolio Analysis—An Analytic Derivation of the Efficient Portfolio Frontier", European Journal of Operations Research, vol. 23, No. 3, pp. 294-300, Mar. 1986.

International Search Report; PCT/US 98/19920.

International Search Report; PCT/US 98/19951.

International Search Report; PCT/US 98/19952.

International Search Report; PCT/US 98/20709.

Nikolopoulos and Felrath, "A Hybrid Expert System for Investment Advising", IEEE, 1994, pp. 1818-1820.

Eggenschwiler and Gamma, "ET++SwapsManager: Using Object Technology in the Financial Engineering Domain", OOPSLA, 1992, pp. 166-177.

Jensen and King, "Frontier: A Graphical Interface for Portfolio Optimization in a Piecewise Linear-Quadratic Risk Framework", IBM Systems Journal, vol. 31, No. 1, 1992, pp. 62-70.

Schmerken, "Making Risk Analysis Easy As Alpha Beta", Wall Street Computer Review, 1988, vol. 5, No. 4, pp. 8, 10, 12.

Malliaris and Salchenberger, "Beating the Best: A Neural Network Challenges the Black-Scholes Formula", IEEE, 1993, pp. 445-449.

"Asset Allocation—One Step at a Time", Global Investor, Mar. 1997, 8 pages.

"1990 Buyer's Guide", Wall Street Computer Review, 1990, 23 pages.

Pantazopoulos et al., "A Knowledge Based System for Evaluation of Option Pricing Algorithms", Computer Science Dept., Purdue University, 1998, pp. 123-140.

Tanaka et al., "Possibility Portfolio Selection", IEEE, 1995, pp. 813-818.

Bellity, "Optimisation Floue Appliquee Au Choix De Portefeuilles", CCF Recherche & Innovation, 1994, 8 pages.

King, "Asymmetric Risk Measures and Tracking Models for Portfolio Optimization Under Uncertainty", J.C. Baltzer AG, 1993, pp. 165-177.

"InterFace Institutional Software + Data", Ibbotson Associates, Wall Street Computer Review, 1998, 4 pages.

Edessess, Michael et al., "Scenario Forecasting: Necessity, Not Choice", Journal of Portfolio Management, vol. 6, No. 3, pp. 10-15, Spring 1980.

Non-Final Office Action for U.S. Appl. No. 12/127,000 mailed Sep. 1, 2009.

* cited by examiner

TAX-AWARE ASSET ALLOCATION

This application claims the benefit of U.S. Provisional Application No. 60/368,624 filed Mar. 29, 2002, which is incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention relate generally to the field of financial advisory services. More particularly, embodiments of the present invention relate to systems and methods for the provision of tax-efficient advice in connection with recommending portfolio allocations among a set of available financial products potentially spanning multiple accounts, including brokerage accounts and tax advantaged accounts.

2. Description of the Related Art

In view of the ongoing shift in retirement savings towards employee-directed defined contribution plans like 401(k), many individual investors have become responsible for managing their own retirement investments. Unfortunately, many people are not well-equipped to make informed investment decisions. Further, the number and diversity of investment options available to individuals is rapidly increasing, thereby making investment decisions more complex by the day.

Many investment software packages claim to help individuals plan for a secure retirement, or some other intermediate goal. However, typical prior art investment software packages are limited in several ways. For example, some packages provide generic asset-allocation suggestions (typically in the form of a pie-chart) and leave the investor to find the actual combination of financial products that meets the suggested asset allocation. However, many investments available to individual investors, such as mutual funds, cannot easily be categorized into any one generic asset class category. Rather, mutual funds are typically a mix of many different asset classes. This property of mutual funds complicates the selection of appropriate instruments to realize a desired asset allocation.

Further, some prior art programs, typically referred to as "retirement calculators," require the user to provide estimates of future inflation, interest rates and the expected return on their investments. In this type of prior art system, the user is likely, and is in fact encouraged, to simply increase the expected investment returns until their desired portfolio value is achieved. As should be appreciated, one of the problems with this type of program is that the user is likely to create an unattainable portfolio based on an unrealistic set of future economic scenarios. That is, the portfolio of financial products required to achieve the X % growth per year in order to meet the user's retirement goal may not be available to the user. Further, the idealistic future economic conditions assumed by the user, for example, 0% inflation and 20% interest rates, may not be macroeconomically consistent. Typical prior art investment packages simply allow the user to manipulate economic conditions until a desired result is achieved rather than encouraging the user to focus on his/her own decisions regarding investment risk, savings rate, and retirement age within the context of realistic economic assumptions. Consequently, the so called "advice" rendered by many of the prior art investment software packages can be misleading and impossible to implement in practice.

In addition, prior art investment advice software have various other disadvantages. Notably, prior art systems do not take into consideration various tax consequences of the advice dispensed, such as unrealized capital gains/losses relating to current investments, differentiation among accounts and assets possessing different tax characteristics and investor-specific tax consequences.

SUMMARY

A method of tax-aware asset allocation is described. According to one embodiment, information is received regarding a set of financial products available for investment in multiple accounts of an investor. The accounts may each have different tax treatment and include at least a taxable account and a tax deferred account. Information is also received regarding current investments held in the taxable account and the tax deferred account. One or more tax characteristics associated with each financial product is determined by evaluating information regarding distributions by the financial product and/or information regarding turnover associated with the financial product. One or more relevant financial circumstances of the investor are also determined. Finally, advice regarding a recommended portfolio of financial products from the set of financial products is formulated. The advice includes a recommendation with respect to which of the taxable account and the tax deferred account each financial product in the recommended portfolio should be held by performing a portfolio optimization process that takes into consideration the current investments, the tax characteristics, the relevant financial circumstances and tax implications of holding the financial products in the taxable account versus the tax deferred account.

In the aforementioned embodiment, the determining of tax characteristics may involve comprises-assigning weights to multiple mutual funds of the set of financial products available for investment by preferring mutual funds with a tax characteristic indicating tax efficiency and using the weights to divide wealth among the plurality of mutual funds.

In various instances of the aforementioned embodiments, the determining of tax characteristics may involve estimating assets owned by a mutual fund of the set of financial products available for investment based on historical fund performance. And, based thereon and upon whether the estimated assets have a propensity to be taxed at a marginal tax rate or a long-term capital gains rate, determining a tax characteristic of the mutual fund.

In the context of various of the aforementioned embodiments, the determining of tax characteristics may involve setting a tax characteristic to indicate low tax efficiency if the assets are estimated to include income-generating securities or dividend-paying equities.

In the context of various of the aforementioned embodiment, the determining of tax characteristics may involve observing a turnover of a mutual fund of the set of financial products available for investment and based thereon setting a tax characteristic of the mutual fund.

In various instances of the aforementioned embodiments, the determining of tax characteristics may involve setting a tax characteristic to indicate low tax efficiency if the turnover is high.

In the context of various of the aforementioned embodiments, the determining of tax characteristics may involve observing historical taxable distributions of a mutual fund of the set of financial products available for investment and based thereon determining a tax characteristic of the mutual fund.

In the context of various of the aforementioned embodiments, the determining of tax characteristics may involve determining a tax characteristic to indicate low tax efficiency if the historical taxable distributions are high.

In the context of the aforementioned embodiment, the historical taxable distributions may be dividends.

In various instances of the aforementioned embodiments, a tax characteristic may be the marginal tax rate of the investor.

In the context of various of the aforementioned embodiments, at least one of the set of financial products may be a municipal bond mutual fund, and the financial circumstances may include the marginal state tax rate of the investor.

In the context of various of the aforementioned embodiments, wealth allocated to each mutual fund may be placed into the accounts based on the tax treatment of the accounts.

In the context of various of the aforementioned embodiments, the accounts may include a taxable brokerage account, an individual retirement account (IRA), an individual tax-advantaged account, an employer-sponsored account, a 401(k) account and/or a 403(b) account.

According to another embodiment of the present invention, available wealth in a portfolio to be invested by an investor is divided into a new money pool and an old money pool. The new money pool represents a portion of the available wealth not previously invested, and the old money pool represents a portion of the available wealth already invested. The available wealth in the old money pool is allocated according to an old money strategy that takes into consideration capital gains, if any, on investments currently owned by the investor. The available wealth in the new money pool is allocated according to a new money strategy. Then, a recommended portfolio is determined of financial products available to the investor for investment in one or more accounts by selecting the financial products based on the old money strategy and the new money strategy.

In the aforementioned embodiment, the old money strategy may involve considering tax effects of transactions during optimization.

In various instances of the aforementioned embodiments, the old money strategy may involve giving capital loss assets full basis.

In the context of various of the aforementioned embodiments, the old money strategy may involve using minimum investment constraints to guard against transaction costs outweighing transaction gains.

In the context of various of the aforementioned embodiments, the new money strategy may involve giving all assets full basis.

In various instances of the aforementioned embodiments, the selection of the financial products involves selecting financial products according to a combined strategy, which uses new contributions, if available, to rebalance the portfolio.

According to another embodiment of the present invention, wealth of an investor is allocated among multiple asset classes according to one or more constraints. At least one asset class is a mutual fund asset class, which includes multiple mutual funds. A tax characteristic of each mutual fund is programmatically determined. A portion of the wealth allocated to the mutual fund asset class is divided among the multiple mutual funds based upon the tax characteristic of each mutual fund and information regarding one or more financial circumstances of the investor.

In yet another embodiment of the present invention, information is received regarding multiple financial products available for investment by in a taxable account and/or a tax-deferred account of the investor. Information is received regarding an amount of wealth of the investor that is available for investment, including information regarding current investments held in each of the financial products and in which of the accounts. One or more tax characteristics associated with each of the financial products is programmatically determined by evaluating information regarding distributions by the financial product and/or information regarding turnover associated with the financial product. A recommended portfolio of financial products and appropriate allocations among the financial products is programmatically determined by performing a portfolio optimization process that takes into consideration the current investments, the one or more tax characteristics of each of the plurality of financial products, one or more relevant financial circumstances of the investor, unrealized capital gains, if any, associated with the current investments and unrealized capital losses, if any, associated with the current investments. Then, an account recommendation with respect to which of the taxable account and the tax deferred account each of the financial products in the recommended portfolio should be held is programmatically determined based on tax implications for the investor of holding the financial products in the taxable account versus holding the financial products in the tax deferred account. Finally, advice is formulated for the investor based on the recommended portfolio and the account recommendation.

In the aforementioned embodiment, the financial products may include stocks, bonds and mutual funds.

In the context of various of the aforementioned embodiments, the available wealth is divided into a new money pool and an old money pool. The new money pool represents a portion of funds not previously invested, and the old money pool represents a portion of funds already invested. The programmatic determination may involve allocating the available wealth in the old money pool according to an old money strategy, which takes into consideration capital gains, if any, on investments currently owned by the investor, and allocating the available wealth in the new money pool according to a new money strategy.

In various instance of the aforementioned embodiments, the portfolio optimization process adjusts returns for those of the financial products held in the taxable account to take into consideration expected tax effects for both accumulations and distributions.

In various instances of the aforementioned embodiments, the recommended portfolio is determined by a portfolio optimization process that maximizes a utility function of the investor and takes into consideration a risk tolerance of the investor.

In yet another embodiment of the present invention, information is received regarding a set of financial products available to a particular investor for investment in multiple accounts of the particular investor potentially having different tax treatment. The multiple accounts include at least a taxable account and a tax-deferred account. Information is received regarding an amount of wealth of the particular investor that is available for investment including information regarding current investments held in each financial product of the set of financial products and in which of the taxable account or the tax-deferred account the current investments are held. One or more tax characteristics associated with each financial products of the set of financial products are determined by evaluating one or more of information regarding distributions by the financial product and information regarding turnover associated with the financial product. Feasible exposures to multiple asset classes achievable by the particular investor are programmatically determined by determining a combination of asset classes and proportions thereof that characterize future performance of each financial product. A recommended portfolio of financial products and appropriate allocations among the financial products are programmatically determined by performing a portfolio optimization process that maximizes an expected utility of wealth for the particular investor taking into consideration the feasible exposures, the current investments, the one or more tax characteristics, one or more relevant financial circumstances of the investor, unrealized capital gains, if any, associated with the current investments and unrealized capital losses, if any, associated with the current investments. Then, an account recommendation is programmatically determined with respect to which of the taxable account and the tax deferred account each of the financial products in the recommended portfolio should be held based on tax implications for the particular investor of holding the financial products in the taxable account versus holding the financial products in the tax deferred account. Finally, advice is formulated for the particular investor based on the recommended portfolio and the account recommendation.

In the aforementioned embodiment, the financial products may include stocks, bonds and mutual funds.

In various instances of the aforementioned embodiments, the amount of wealth is divided into a new money pool and an old money pool. The new money pool represents a portion of funds not previously invested, and the old money pool represents a portion of funds already invested. Further, the programmatic determination involves allocating wealth in the old money pool according to an old money strategy and allocating wealth in the new money pool according to a new money strategy.

In the context of various of the aforementioned embodiments, the portfolio optimization process may adjust returns for those of the set of financial products held in the taxable account to take into consideration expected tax effects for both accumulations and distributions.

In the context of various of the aforementioned embodiments, the accounts may include a taxable brokerage account, an individual retirement account (IRA), an individual tax-advantaged account, an employer-sponsored account, a 401 (k) account and/or a 403(b) account.

Other features of the present invention will be apparent from the accompanying drawings and from the detailed description that follows.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
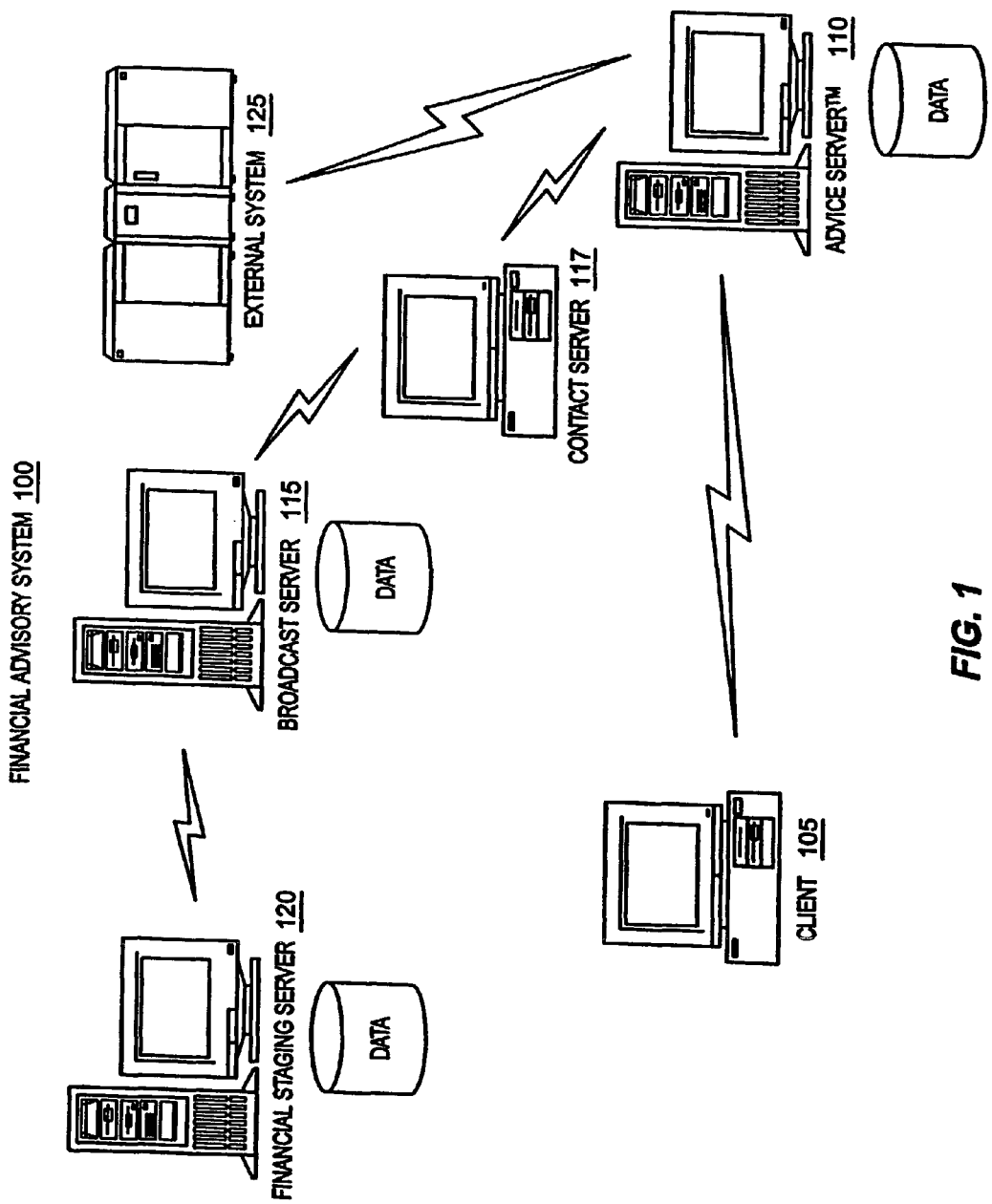
FIG. 1 illustrates a financial advisory system according to one embodiment of the present invention.

A mechanism is described for providing tax-efficient advice in connection with recommending portfolio allocations among a set of available financial products potentially spanning multiple accounts, including brokerage accounts and tax advantaged accounts. Broadly speaking, the advice offered by a financial advisory platform utilizing the tax-aware asset allocation techniques described herein may span any combination of taxable and tax-deferred accounts, such as 401(k), Individual Retirement Accounts (IRAs), 403(b), 457, Roth IRA, SEP-IRA and Keogh accounts, and may encompass all or part of an investor's portfolio. Ultimately, it is thought that the comprehensive nature of factors taken into consideration, by various embodiments of the present invention, including unrealized capital gains/losses of current investments, differentiation among accounts and assets possessing different tax characteristics and awareness of investor-specific tax consequences, will make the resulting advice, optimization, simulation, forecasting, and/or monitoring more beneficial to users.

In the following description, for the purposes of explanation, numerous specific details are set forth in order to provide a thorough understanding. It will be apparent, however, to one skilled in the art that embodiments of the present invention may be practiced without some of these specific details. In other instances, well-known structures and devices are shown in block diagram form.

Embodiments of the present invention include various processes, which will be described below. The processes may be embodied in machine-executable instructions. The instructions can be used to cause a processor which is programmed with the instructions to perform the processes according to the various embodiments of the present invention. Alternatively, the processes may be performed by specific hardware components that contain hardwired logic, or by any combination of programmed computer components and custom hardware components.

Embodiments of the present invention may be provided as a computer program product which may include a machine-readable medium having stored thereon instructions which may be used to program a computer (or other electronic devices) to perform one or more processes according to various embodiments of the present invention. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. Moreover, embodiments of the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While, embodiments of the present invention will be described with reference to a financial advisory system, the methods and apparatus described herein are equally applicable to other types of asset allocation applications; financial planning applications; investment advisory services; financial product selection services; optimization, simulation, forecasting, and/or monitoring frameworks; and automated financial product screening tools, such as electronic personal shopping agents and the like.

Terminology

The phrases "in one embodiment," "according to one embodiment," and the like generally mean that the particular feature, structure, or characteristic following the phrase is included in at least one embodiment of the invention, and may be included in more than one embodiment of the invention. Importantly, such phases do not necessarily refer to the same embodiment.

The term "connected" and "coupled" and related terms are used in an operational sense and are not necessarily limited to a direct connection or coupling.

If the specification states a component or feature "may", "can", "could", or "might" be included or have a characteristic, that particular component or feature is not required to be included or have the characteristic.

The term "responsive" includes completely or partially responsive. As used herein a "financial product" broadly refers to current and future facilities through which, or through the acquisition of which, a person or entity: (1) "makes a financial investment," or (2) "manages financial risk." For the purposes of the definition of "financial product," the person or entity (referred to as the investor) "makes a financial investment" if:

(a) the investor gives money or money's worth (the "contribution") to another person or entity and any of the following apply:
  (i) the other person or entity uses the contribution to generate a financial return or other benefit for the investor,
  (ii) the investor intends that the other person or entity will use the contribution to generate a financial return or other benefit for the investor (even if no return or benefit is in fact generated),
  (iii) the other person or entity intends that the contribution will be used to generate a financial return or other benefit for the investor; and
(b) the investor has no day to day control over the use of the contribution to generate the return or benefit.

For the purposes of the definition of "financial product," the investor "manages financial risk" if they:
(a) manage the financial consequences to them of particular circumstances happening; or
(b) avoid or limit the financial consequences of fluctuations in, or in the value of, receipts or costs (including prices and interest rates).

For purposes of illustration, the term "financial product" is intended to include, but not be limited to, the following specific examples:
(a) a security (i.e., an instrument which (i) is issued in bearer or registered form, and (ii) is of a type commonly dealt in upon securities exchanges or markets or commonly recognized in any area in which it is issued or dealt in as a medium for investment, and (iii) evidences a share, participation or other interest in property or in an enterprise or evidences an obligation of the issuer);

(b) any of the following in relation to a registered scheme:
  (i) an interest in the scheme,
  (ii) a legal or equitable right or interest in an interest covered by subparagraph (i),
  (iii) an option to acquire, by way of issue, an interest or right covered by subparagraph (i) or (ii);
(c) a derivative;
(d) a contract of insurance;
(e) a debenture, stock or bond issued or proposed to be issued by a government;
(f) something declared or defined by current or future state or federal regulations to be any of the foregoing or to be a financial product; or
(g) a hybrid or combination of the forgoing.

A "portfolio" generally refers to a collection of one or more financial products or investments. A portfolio may span multiple financial institutions and/or accounts and may or may not include financial products subject to the optimization methodologies described herein.

System Overview

Embodiments of the present invention may be included within a client-server transaction based financial advisory system 100 such as that illustrated in FIG. 1. In the example depicted in FIG. 1, the financial advisory system 100 includes a financial staging server 120, a broadcast server 115, a content server 117, an AdviceServer™ 110 (AdviceServer™ is a trademark of Financial Engines, Inc., the assignee of the present invention), and a client 105.

The financial staging server 120 may serve as a primary staging and validation area for the publication of financial content. In this manner, the financial staging server 120 acts as a data warehouse. Raw source data, typically time series data, may be refined and processed into analytically useful data on the financial staging server 120. On a monthly basis, or whatever the batch processing interval may be, the financial staging server 120 converts raw time series data obtained from data vendors from the specific vendor's format into a standard format that can be used throughout the financial advisory system 100. Various financial engines may be run to generate data for validation and quality assurance of the data received from the vendors. Additional engines may be run to generate module inputs, model parameters, and intermediate calculations needed by the system based on raw data received by the vendors. Any calibrations of the analytic data needed by the financial engines may be performed prior to publishing the final analytic data to the broadcast server 115.

The broadcast server 115 is a database server. As such, it runs an instance of a Relational Database Management System (RDBMS), such as Microsoft SQL-Server™, Oracle™ or the like. The broadcast server 115 provides a single point of access to all fund information and analytic data. When advice servers such as AdviceServer 110 need data, they may query information from the broadcast server database. The broadcast server 115 may also populate content servers, such as content server 117, so remote implementations of the AdviceServer 110 need not communicate directly with the broadcast server 115.

The AdviceServer 110 is the primary provider of services for the client 105. The AdviceServer 110 also acts as a proxy between external systems, such as external system 125, and the broadcast server 115 or the content server 117. The AdviceServer 110 is the central database repository for holding user profile and portfolio data. In this manner, ongoing portfolio analysis may be performed and alerts may be triggered, as described further below.

According to the embodiment depicted, the user may interact with and receive feedback from the financial advisory system 100 using client software which may be running within a browser application or as a standalone desktop application on the user's personal computer 105. The client software communicates with the AdviceServer 110 which may act as a HTTP server.

An Exemplary Computer System

Figure 2:
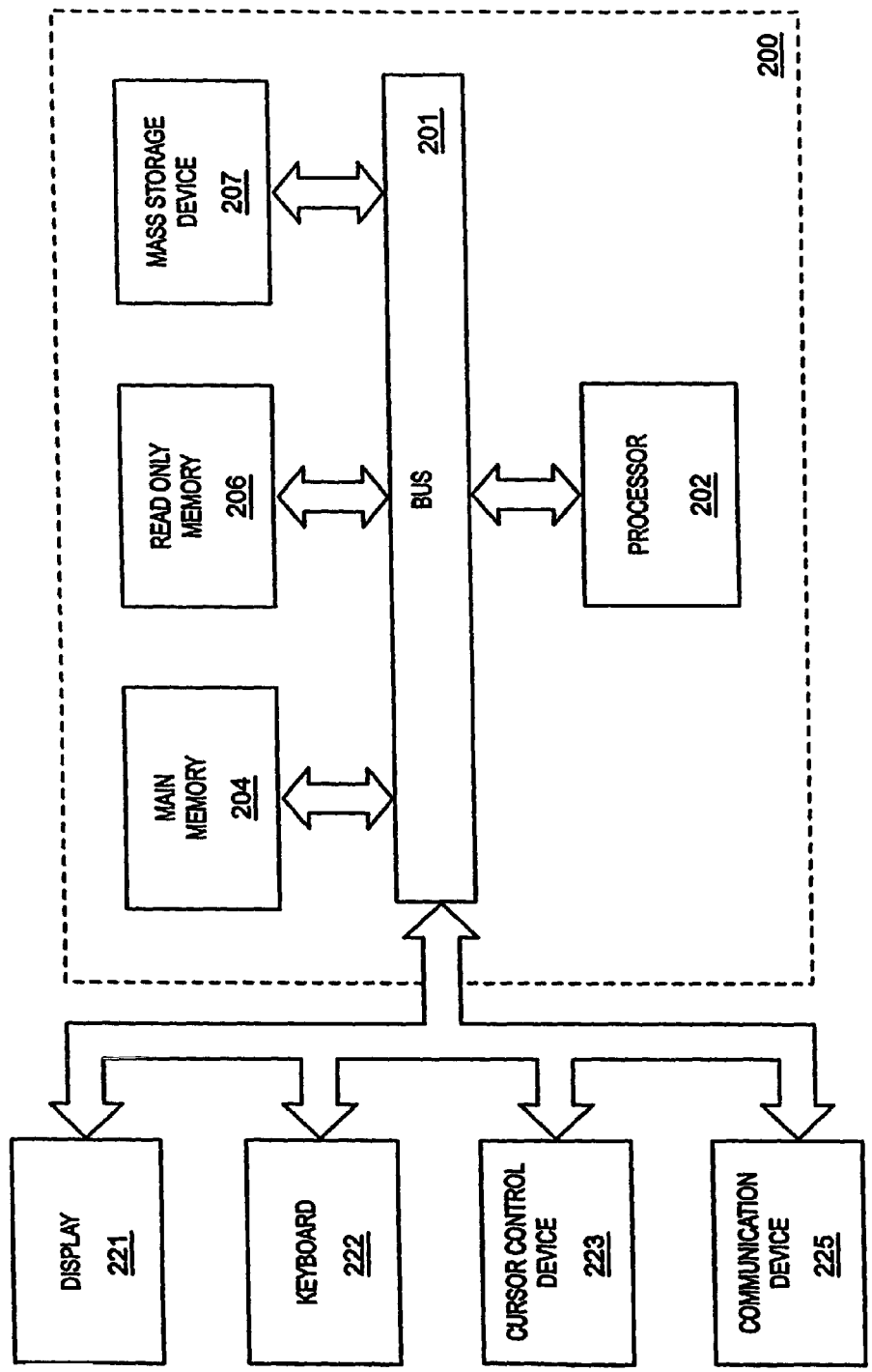
FIG. 2 is an example of a typical computer system upon which one embodiment of the present invention can be implemented.

Having briefly described one embodiment of the financial advisory system 100, a computer system 200 representing an exemplary client 105 or server in which features of the present invention may be implemented will now be described with reference to FIG. 2. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user. For example, graphical depictions of expected portfolio performance, asset allocation for an optimal portfolio, charts indicating retirement age probabilities, and other data types may be presented to the user on the display device 221. Typically, an alphanumeric input device 222, including alphanumeric and other keys, may be coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 for accessing remote servers, such as the AdviceServer 110, or other servers via the Internet, for example. The communication device 225 may include a modem, a network interface card, or other well-known interface devices, such as those used for coupling to an Ethernet, token ring, or other types of networks. In any event, in this manner, the computer system 200 may be coupled to a number of clients and/or servers via a conventional network infrastructure, such as a company's Intranet and/or the Internet, for example.

Exemplary Analytic Modules

Figure 3:
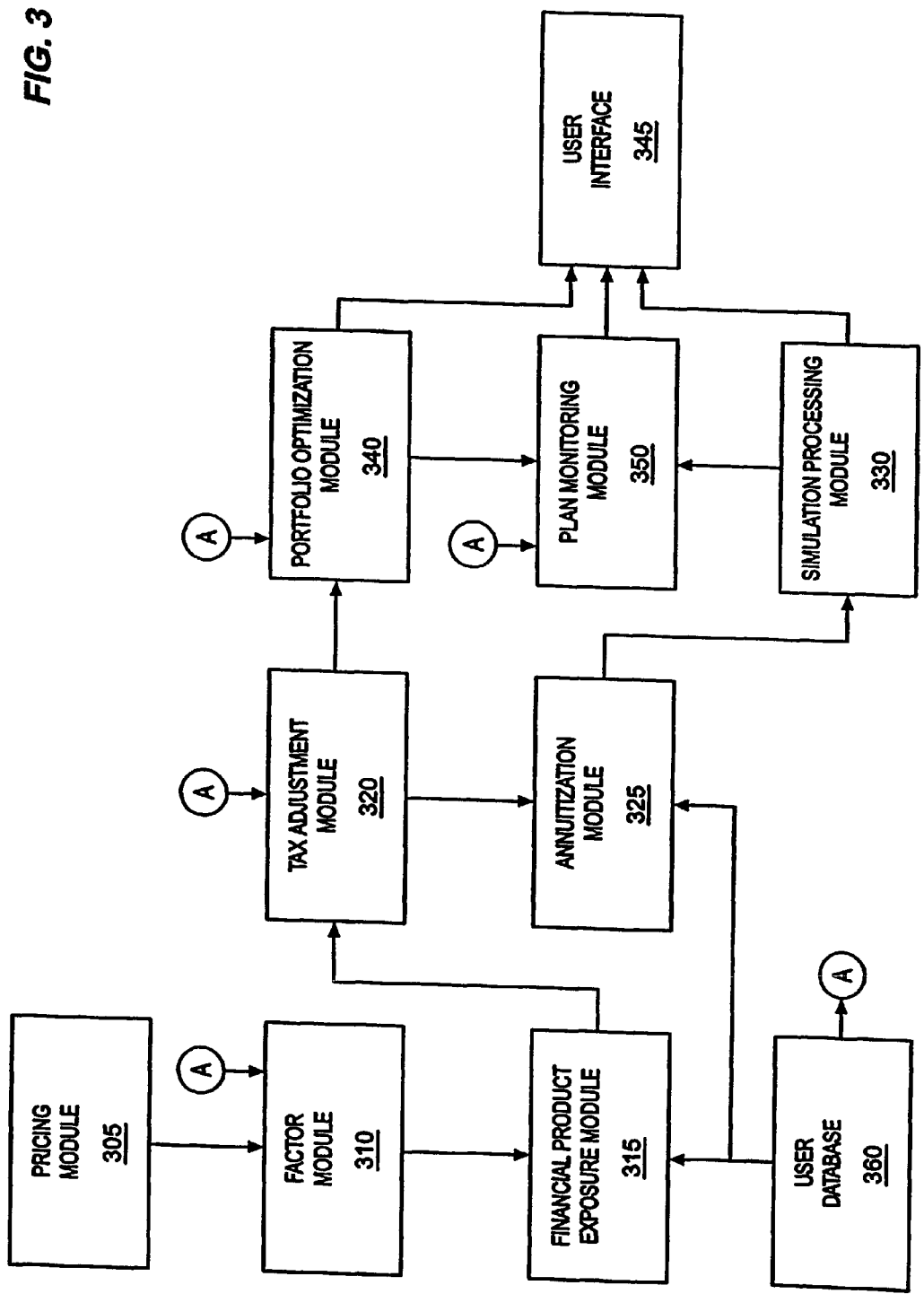
FIG. 3 is a block diagram illustrating various analytic modules according to one embodiment of the present invention.

FIG. 3 is a simplified block diagram illustrating exemplary analytic modules of the financial advisory system 100 according to one embodiment of the present invention. According to the embodiment depicted, the following modules are provided: a pricing module 305, a factor module 310, a financial product mapping module 315, a tax adjustment module 320, an annuitization module 325, a simulation processing module 330, a portfolio optimization module 340, a user interface (UI) module 345, and a plan monitoring module 350. It is contemplated that the functionality described herein may be implemented in more or less modules than discussed below. Additionally, the modules and functionality may be distributed in various configurations among a client system, such as client 105 and one or more server systems, such as the financial staging server 120, the broadcast server 115, or the AdviceServer 110. The functionality of each of the exemplary modules will now be briefly described.

An "econometric model" is a statistical model that provides a means of forecasting the levels of certain variables referred to as "endogenous variables," conditional on the levels of certain other variables, known as "exogenous variables," and in some cases previously determined values of the endogenous variables (sometimes referred to as lagged dependent variables). The pricing module 305 is an equilibrium econometric model for forecasting prices and returns (also referred to herein as "core asset scenarios") for a set of core asset classes. The pricing module provides estimates of current levels and forecasts of economic factors (also known as state variables), upon which the estimates of core asset class returns are based. According to one embodiment of the present invention, the economic factors may be represented with three exogenous state variables, price inflation, a real short-term interest rate, and dividend growth. The three exogenous state variables may be fitted with autoregressive time series models to match historical moments of the corresponding observed economic variables, as described further below.

In any event, the resulting core asset classes are the foundation for portfolio simulation and are designed to provide a coherent and internally consistent (e.g., no arbitrage) set of returns. By arbitrage what is meant is an opportunity to create a profitable trading opportunity that involves no net investment and positive values in all states of the world.

According to one embodiment, the core asset classes include short-term US government bonds, long-term US government bonds, and US equities. To expand the core asset classes to cover the full range of possible investments that people generally have access to, additional asset classes may be incorporated into the pricing module 305 or the additional asset classes may be included in the factor model 310 and be conditioned on the core asset classes, as discussed further below.

Based upon the core asset scenarios generated by the pricing module 305, the factor module 310 produces return scenarios (also referred to herein as "factor model asset scenarios") for a set of factor asset classes that are used for both exposure analysis, such as style analysis, and the simulation of portfolio returns. The additional asset classes, referred to as factors, represented in the factor model are conditional upon the core asset class return scenarios generated by the pricing module 305. According to one embodiment, these additional factors may correspond to a set of asset classes or indices that are chosen in a manner to span the range of investments typically available to individual investors in mainstream mutual funds and defined contribution plans. For example, the factors may be divided into the following groups: cash, bonds, equities, and foreign equities. The equities group may further be broken down into two different broad classifications (1) value versus growth and (2) market capitalization. Growth stocks are basically stocks with relatively high prices relative to their underlying book value (e.g., high price-to-book ratio). In contrast, value stocks have relatively low prices relative to their underlying book value. With regard to market capitalization, stocks may be divided into groups of large, medium, and small capitalization. An exemplary set of factors is listed below in Table 1.

TABLE 1

Exemplary Set of Factors

| Group | Factor |
| --- | --- |
| Cash: | Short Term US Bonds (core class) |
| Bonds: | Intermediate-term US Bonds (core class) |
|  | Long-term US Bonds (core class) |
|  | US Corporate Bonds |
|  | US Mortgage Backed Securities |
|  | Non-US Government Bonds |
| Equities: | Large Cap Stock -- Value |
|  | Large Cap Stock -- Growth |
|  | Mid Cap Stock -- Value |
|  | Mid Cap Stock -- Growth |
|  | Small Cap Stock -- Value |
|  | Small Cap Stock -- Growth |
| Foreign: | International Equity -- Europe |
|  | International Equity -- Pacific |
|  | International Equity -- Emerging Markets |

At this point it is important to point out that more, less, or a completely different set of factors may be employed depending upon the specific implementation. The factors listed in Table 1 are simply presented as an example of a set of factors that achieve the goal of spanning the range of investments typically available to individual investors in mainstream mutual funds and defined contribution plans. It will be apparent to those of ordinary skill in the art that alternative factors may be employed. In particular, it is possible to construct factors that represent functions of the underlying asset classes for pricing of securities that are nonlinearly related to the prices of certain asset classes (e.g., derivative securities). In other embodiments of the present invention, additional factors may be relevant to span a broader range of financial alternatives, such as industry specific equity indices.

On a periodic basis, the financial product mapping module 315 maps financial product returns onto the factor model. In one embodiment, the process of mapping financial product returns onto the factor model comprises decomposing financial product returns into exposures to the factors. The mapping, in effect, indicates how the financial product returns behave relative to the returns of the factors. According to one embodiment, the financial product mapping module 315 is located on one of the servers (e.g., the financial staging server 120, the broadcast server 115, or the AdviceServer 110). In alternative embodiments, the financial product mapping module 315 may be located on the client 105.

In one embodiment of the present invention, an external approach referred to as "returns-based style analysis" is employed to determine a financial product's exposure to the factors. The approach is referred to as external because it does not rely upon information that may be available only from sources internal to the financial product. Rather, in this embodiment, typical exposures of the financial product to the factors may be established based simply upon realized returns of a financial product, as described further below. For more background regarding returns-based style analysis see Sharpe, William F. "Determining a Fund's Effective Asset Mix," Investment Management Review, December 1988, pp. 59-69 and Sharpe, William F. "Asset Allocation: Management Style and Performance Measurement," The Journal of Portfolio Management, 18, no. 2 (Winter 1992), pp. 7-19 ("Sharpe [1992]").

Alternative approaches to determining a financial product's exposure to the factors include surveying the underlying assets held in a financial product (e.g. a mutual fund) via information filed with regulatory bodies, categorizing exposures based on standard industry classification schemes (e.g. SIC codes), identifying the factors exposures based on analysis of the structure of the product (e.g. equity index options, or mortgage backed securities), and obtaining exposure information based on the target benchmark from the asset manager of the financial product. In each method, the primary function of the process is to determine the set of factor exposures that best describes the performance of the financial product.

The tax adjustment module 320 takes into account tax implications of the financial products and financial circumstances of the user. For example, the tax adjustment module 320 may provide methods to adjust taxable income and savings, as well as estimates for future tax liabilities associated with early distributions from pension and defined contribution plans, and deferred taxes from investments in qualified plans. Further, the returns for financial products held in taxable investment vehicles (e.g. a standard brokerage account) may be adjusted to take into account expected tax effects for both accumulations and distributions. For example, the component of returns attributable to bond income and dividend income may be taxed at the user's marginal income tax rate and the component of returns attributable to capital gains should be taxed at an appropriate capital gains tax rate depending upon the holding period. As illustrated further below, the tax adjustment module 320 may also takes into account unrealized gains and losses of current investments for use in optimizing the portfolio.

Additionally, the tax module 320 may forecast future components of the financial products total return due to dividend income versus capital gains based upon one or more characteristics of the financial products including, for example, the active or passive nature of the financial product's management, turnover ratio, and category of financial product. This allows precise calculations incorporating the specific tax effects based on the financial product and financial circumstances of the investor. Finally, the tax module 320 facilitates tax efficient investing by determining optimal asset allocation among taxable accounts (e.g., brokerage accounts) and non-taxable accounts (e.g., an Individual Retirement Account (IRA), or employer sponsored 401(k) plan). In this manner the tax module 320 is designed to estimate the tax impact for a particular user with reference to that particular user's income tax rates, capital gains rates, and available financial products. Ultimately, the tax module 320 produces tax-adjusted returns for each available financial product and tax-adjusted distributions for each available financial product.

The tax adjustment module 320 may also be used to provide tax-aware asset allocation advice. In one embodiment, tax adjustment module 320 considers whether certain mutual funds are in a taxable or non-taxable account, and for mutual funds in taxable account, allocates wealth among various mutual funds based on certain tax characteristics of the funds. An exemplary embodiment of the tax-aware asset allocation for mutual funds is described in more detail in Appendix A attached hereto. The provision of tax-aware financial advice need not be implemented in the tax adjustment module 320, but may be implemented in any software module or server, including the pricing module 305, the factor module 310, the financial product mapping module 315, the annuitization module 325, the simulation processing module 330, and/or the portfolio optimization module 340.

The portfolio optimization module 340 calculates the utility maximizing set of financial products under a set of constraints defined by the user and the available feasible investment set. In one embodiment, the calculation is based upon a mean-variance optimization of the financial products. The constraints defined by the user may include bounds on asset class and/or specific financial product holdings. In addition, users can specify intermediate goals such as buying a house or putting a child through college, for example, that are incorporated into the optimization. In any event, importantly, the optimization explicitly takes into account the impact of future contributions and expected withdrawals on the optimal asset allocation. Additionally, the covariance matrix used during optimization is calculated based upon the forecasts of expected returns for the factors generated by the factor module 310 over the investment time horizon. As a result, the portfolio optimization module 340 may explicitly take into account the impact of different investment horizons, including the horizon effects impact from intermediate contributions and withdrawals.

The simulation processing module 330 provides additional analytics for the processing of raw simulated return scenarios into statistics that may be displayed to the user via the UI 345. In the one embodiment of the present invention, these analytics generate statistics such as the probability of attaining a certain goal, or the estimated time required to reach a certain level of assets with a certain probability. The simulation processing module 330 also incorporates methods to adjust the simulated scenarios for the effects induced by sampling error in relatively small samples. The simulation processing module 330 provides the user with the ability to interact with the portfolio scenarios generated by the portfolio optimization module 340 in real-time.

The annuitization module 325 provides a meaningful way of representing the user's portfolio value at the end of the term of the investment horizon. Rather than simply indicating to the user the total projected portfolio value, one standard way of conveying the information to the user is converting the projected portfolio value into a retirement income number. The projected portfolio value at retirement may be distributed over the length of retirement by dividing the projected portfolio value by the length of retirement. More sophisticated techniques may involve determining how much the projected portfolio value will grow during retirement and additionally consider the effects of inflation. In either event, however, these approaches erroneously assume the length of the retirement period is known in advance.

It is desirable, therefore, to present the user with a retirement income number that is more representative of an actual standard of living that could be locked in for the duration of the user's retirement. According to one embodiment, this retirement income number represents the inflation adjusted income that would be guaranteed by a real annuity purchased from an insurance company or synthetically created via a trading strategy involving inflation-indexed treasury bond securities. In this manner, the mortality risk is taken out of the picture because regardless of the length of the retirement period, the user would be guaranteed a specific annual real income. To determine the retirement income number, standard methods of annuitization employed by insurance companies may be employed. Additionally, mortality probabilities for an individual of a given age, risk profile, and gender may be based on standard actuarial tables used in the insurance industry. For more information see Bowers, Newton L. Jr., et al, "Actuarial Mathematics," The Society of Actuaries, Itasca, Ill., 1986, pp. 52-59 and Society of Actuaries Group Annuity Valuation Table Task Force, "1994 Group Annuity Mortality Table and 1994 Group Annuity Reserving Table," Transactions of the Society of Actuaries, Volume XLVII, 1994, pp. 865-913. Calculating the value of an inflation-adjusted annuity value may involve estimating the appropriate values of real bonds of various maturities. The pricing module 305 generates the prices of real bonds used to calculate the implied real annuity value of the portfolio at the investment horizon.

Referring now to the plan monitoring module 350, a mechanism is provided for alerting the user of the occurrence of various predetermined conditions involving characteristics of the recommended portfolio. Because the data upon which the portfolio optimization module 340 depends is constantly changing, it is important to reevaluate characteristics of the recommended portfolio on a periodic basis so that the user may be notified in a timely manner when there is a need for him/her to take affirmative action, for example. According to one embodiment, the plan monitoring module 350 is located on the AdviceServer 110. In this manner, the plan monitoring module 350 has constant access to the user profile and portfolio data.

In one embodiment, the occurrence of two basic conditions may cause the plan monitoring module 350 to trigger a notification or alert to the user. The first condition that may trigger an alert to the user is the current probability of achieving a goal falling outside of a predetermined tolerance range of the desired probability of a achieving the particular goal. Typically a goal is a financial goal, such as a certain retirement income or the accumulation of a certain amount of money to put a child though college, for example. Additionally, the plan monitoring module 350 may alert the user even if the current probability of achieving the financial goal is within the predetermined tolerance range if a measure of the currently recommended portfolio's utility has fallen below a predetermined tolerance level. Various other conditions are contemplated that may cause alerts to be generated. For example, if the nature of the financial products in the currently recommended portfolio have changed such that the risk of the portfolio is outside the user's risk tolerance range, the user may receive an indication that he/she should rebalance the portfolio. Plan monitoring processing, exemplary real world events that may lead to the above-described alert conditions, and additional alert conditions are described further below.

The UI module 345 provides mechanisms for data input and output to provide the user with a means of interacting with and receiving feedback from the financial advisory system 100, respectively. Further description of a UI that may be employed according to one embodiment of the present invention is presented below.

Other modules may be included in the financial advisory system 100 such as a pension module and a social security module. The pension module may be provided to estimate pension benefits and income. The social security module may provide estimates of the expected social security income that an individual will receive upon retirement. The estimates may be based on calculations used by the Social Security Administration (SSA), and on probability distributions for reductions in the current level of benefits.

Note that in the foregoing description, in order to facilitate explanation, the various exemplary analytic modules of the financial advisory system 100 have been generally discussed as if they were each implemented as a single device or process. However, each analytic module may actually comprise multiple physical and/or logical devices connected in a distributed architecture, and the various functions performed may actually be distributed among multiple devices and/or processes. Additionally, it is contemplated that the functions performed by the various exemplary analytic modules may be consolidated and/or distributed differently than as described. For example, any function described herein may be implemented on any number of machines or on a single machine. Also, any process described herein may be divided across multiple machines.

Core Asset Scenario Generation

Figure 4:
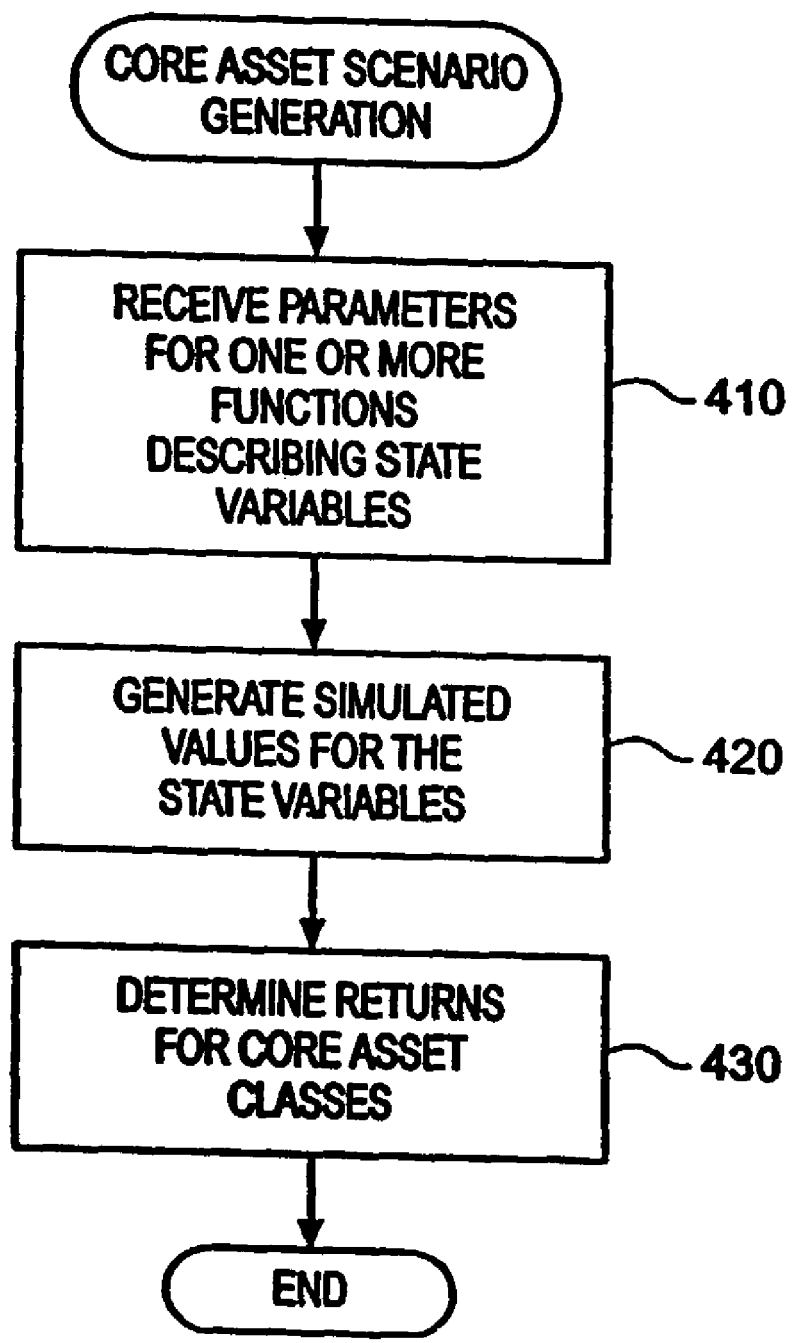
FIG. 4 is a flow diagram illustrating core asset class scenario generation according to one embodiment of the present invention.

FIG. 4 is a flow diagram illustrating core asset class scenario generation according to one embodiment of the present invention. In embodiments of the present invention, core assets include short-term US government bonds, long-term US government bonds, and US equities. At step 410, parameters for one or more functions describing state variables are received. The state variables may include general economic factors, such as inflation, interest rates, dividend growth, and other variables. Typically, state variables are described by econometric models that are estimated based on observed historical data.

At step 420, these parameters are used to generate simulated values for the state variables. The process begins with a set of initial conditions for each of the state variables. Subsequent values are generated by iterating the state variable function to generate new values conditional on previously determined values and a randomly drawn innovation term. In some embodiments, the state variable functions may be deterministic rather than stochastic. In general, the randomly drawn innovation terms for the state variable functions may be correlated with a fixed or conditional covariance matrix.

At step 430, returns for core asset classes are generated conditional on the values of the state variables. Returns of core asset classes may be described by a function of a constant, previously determined core asset class returns, previously determined values of the state variables, and a random innovation term. Subsequent values are generated by iterating a core asset class function to generate new values conditional on previously determined values and a random draws of the innovation term. In some embodiments, the core asset class functions may be deterministic rather than stochastic. In general, the randomly drawn innovation terms for the core asset class functions may be correlated with a fixed or conditional covariance matrix.

In alternative embodiments, steps 410 and 420 may be omitted and the core asset class returns may be generated directly in an unconditional manner. A simple example of such a model would be a function consisting of a constant and a randomly drawn innovation term.

A preferred approach would jointly generate core asset class returns based on a model that incorporates a stochastic process (also referred to as a pricing kernel) that limits the prices on the assets and payoffs in such a way that no arbitrage is possible. By further integrating a dividend process with the other parameters an arbitrage free result can be ensured across both stocks and bonds. Further description of such a pricing kernel is disclosed in U.S. Pat. No. 6,125,355.

Factor Model Asset Scenario Generation

Figure 5:
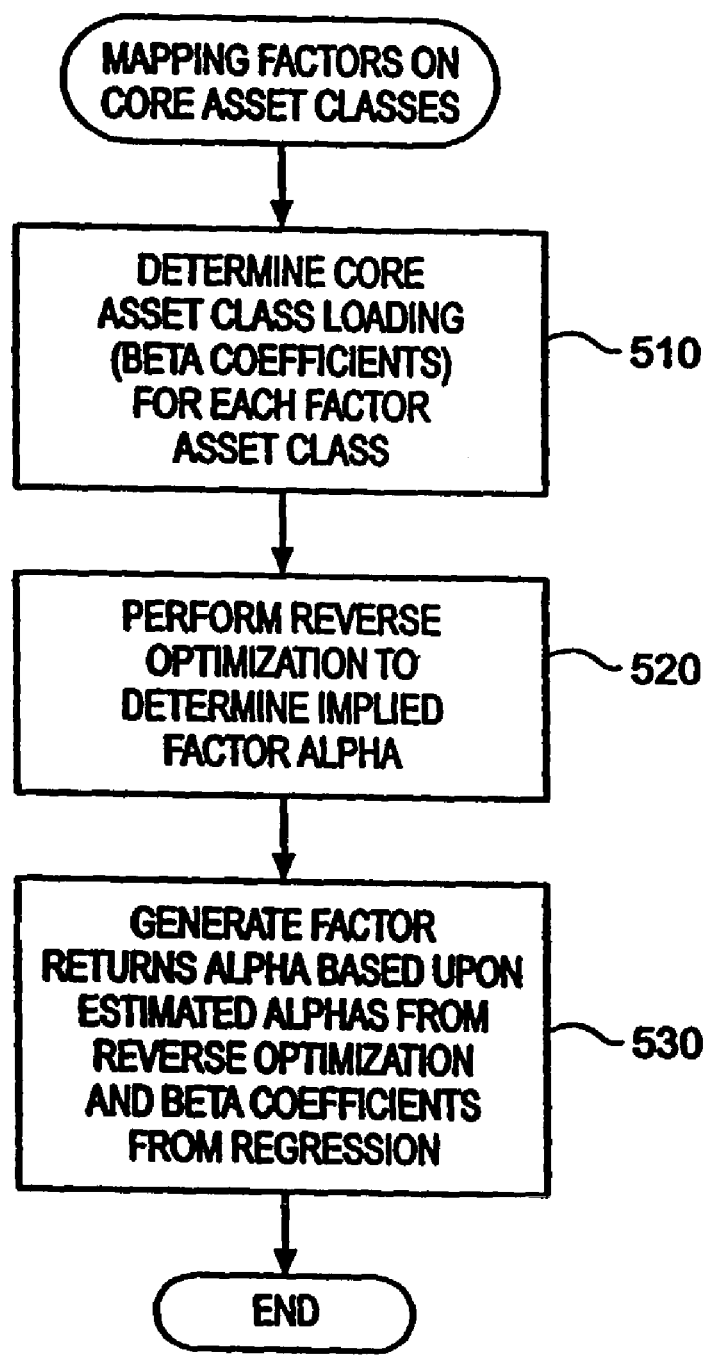
FIG. 5 is a flow diagram illustrating factor asset class scenario generation according to one embodiment of the present invention.

Referring now to FIG. 5, factor model asset scenario generation will now be described. A scenario in this context is a set of projected future values for factors. According to this embodiment, the factors may be mapped onto the core asset factors by the following equation:

$$r_{it} = \alpha_i + \beta_{1i}ST\_Bonds_t + \beta_{2i}LT\_Bonds_t + \beta_{3i}US\_Stocks_t + \epsilon_t \quad (EQ\ \#1)$$

where $r_{it}$ represents the return for a factor, i, at time t $\beta_{ji}$ represent slope coefficients or the sensitivity of the factor i to core asset class j $ST\_Bonds_t$ is a core asset class representing the returns estimated by the pricing module 305 for short-term US government bonds at time t $LT\_Bonds_t$ is a core asset class representing the returns estimated by the pricing module 305 for long-term US government bonds at time t.

$US\_Stocks_t$ is a core asset class representing the returns estimated by the pricing module 305 for US stocks at time t.

$\alpha_i$ is a constant representing the average returns of factor asset class i relative to the core asset class exposures ("factor alpha").

$\epsilon_t$ is a residual random variable representing the returns of factor asset class i that are not explained by the core asset class exposures ("residual variance").

At step 510, the beta coefficients (also referred to as the loadings or slope coefficients) for each of the core asset classes are determined. According to one embodiment, a regression is run to estimate the values of the beta coefficients. The regression methodology may or may not include restrictions on the sign or magnitudes of the estimated beta coefficients. In particular, in one embodiment of the present invention, the coefficients may be restricted to sum to one. However, in other embodiments, there may be no restrictions placed on the estimated beta coefficients.

Importantly, the alpha estimated by the regression is not used for generating the factor model asset scenarios. Estimates of alpha based on historical data are extremely noisy because the variance of the expected returns process is quite high relative to the mean. Based on limited sample data, the estimated alphas are poor predictors of future expected returns. At any rate, according to one embodiment, a novel way of estimating the alpha coefficients that reduces the probability of statistical error is used in the calibration of the factor model. This process imposes macroconsistency on the factor model by estimating the alpha coefficients relative to a known efficient portfolio, namely the Market Portfolio. Macroconsistency is the property that expected returns for the factor asset classes are consistent with an observed market equilibrium; that is, estimated returns will result in markets clearing under reasonable assumptions. The Market Portfolio is the portfolio defined by the aggregate holdings of all asset classes. It is a portfolio consisting of a value-weighted investment in all factor asset classes. Therefore, in the present example, macroconsistency may be achieved by setting the proportion invested in each factor equal to the percentage of the total market capitalization represented by the particular factor asset class.

At step 520, a reverse optimization may be performed to determine the implied factor alpha for each factor based upon the holdings in the Market Portfolio. This procedure determines a set of factor alphas that guarantee consistency with the observed market equilibrium. In a standard portfolio optimization, Quadratic Programming (QP) is employed to maximize the following utility function:

$$E(r)^T X - \frac{(X^T C(r) X)}{\tau}, u^T X = 1 \quad (EQ\ \#2)$$

where, $E(r)$ represents expected returns for the asset classes, $C(r)$ represents the covariance matrix for the asset class returns, $\tau$, Tau, represents a risk tolerance value, $X$ is a matrix representing the proportionate holdings of each asset class of an optimal portfolio comprising the asset classes, and $u$ is a vector of all ones.

C(r) may be estimated from historical returns data or more advantageously may be estimated from projected returns generated by a pricing kernel model.

Inputs to a standard portfolio optimization problem include E(r), C(r), and Tau and QP is used to determine X. However, in this case, X is given by the Market Portfolio, as described above, and a reverse optimization solves for E(r) by simply backing out the expected returns that yield X equal to the proportions of the Market Portfolio.

Quadratic Programming (QP) is a technique for solving an optimization problem involving a quadratic (squared terms) objective function with linear equality and/or inequality constraints. A number of different QP techniques exist, each with different properties. For example, some are better for suited for small problems, while others are better suited for large problems. Some are better for problems with very few constraints and some are better for problems with a large number of constraints. According to one embodiment of the present invention, when QP is called for, an approach referred to as an "active set" method is employed herein. The active set method is explained in Gill, Murray, and Wright, "Practical Optimization," Academic Press, 1981, Chapter 5.

The first order conditions for the optimization of Equation #2 are:

$$E(r) = 2C(r)\frac{X}{\tau} + Ku \quad (EQ\ \#3)$$

where K is a Lagrange multiplier; hence, knowing the Market Portfolio and any two values of E(r) (for example, the risk free rate and the return on US equities) the full set of expected returns that are consistent with the Market Portfolio can be derived. The two values of E(r) required for the reverse optimization follow from the expected returns of the core assets.

At step 530, factor returns may be generated based upon the estimated alphas from step 520 and the estimated beta coefficients from step 510. As many factor model asset scenarios as are desired may be generated using Equation #1 and random draws for the innovation values $\epsilon_t$. A random value for $\epsilon_t$ is selected for each evaluation of Equation #1. According to one embodiment, $\epsilon_t$ is distributed as a standard normal variate. In other words $\epsilon_t$ is drawn from a standard normal distribution with a mean of 0 and a standard deviation of 1.

Advantageously, in this manner, a means of simulating future economic scenarios and determining the interrelation of asset classes is provided.

Financial Product Exposure Determination

As discussed above, one method of determining how a financial product behaves relative to a set of factor asset classes is to perform returns-based style analysis. According to one embodiment, returns for a given financial product may be estimated as a function of returns in terms of one or more of the factor asset classes described above based on the following equation:

$$r_{ft} = \alpha_{ft} + S_{f1}r_{1t} + S_{f2}r_{2t} + \ldots + S_{fn}r_{nt} + \epsilon_t \quad (EQ\ \#4)$$

where, $\alpha_{ft}$ is the mean of the left over residual risk ("selection variance") of the financial product return that cannot be explained in terms of the factor loadings.

$r_{ft}$ is the return for financial product f at time t, $r_{nt}$ is the return for factor n at time t, and $\epsilon_t$ is the residual at time t that is unexplained by movements in the factor returns.

The financial product exposure determination module 315 computes the factor asset class exposures for a particular fund via a nonlinear estimation procedure. The exposure estimates, $S_{fn}$, are called style coefficients, and are generally restricted to the range [0,1] and to sum to one. In other embodiments, these restrictions may be relaxed (for example, with financial products that may involve short positions, the coefficients could be negative). Alpha may be thought of as a measure of the relative under or over performance of a particular fund relative to its passive style benchmark.

At this point in the process, the goal is to take any individual group of assets that people might hold, such as a group of mutual funds, and map those assets onto the factor model, thus allowing portfolios to be simulated forward in time. According to one embodiment, this mapping is achieved with what is referred to as "returns-based style analysis" as described in Sharpe [1992], which is hereby incorporated by reference. Generally, the term "style analysis" refers to determining a financial product's exposure to changes in the returns of a set of major asset classes using Quadratic Programming or similar techniques.

Figure 6:
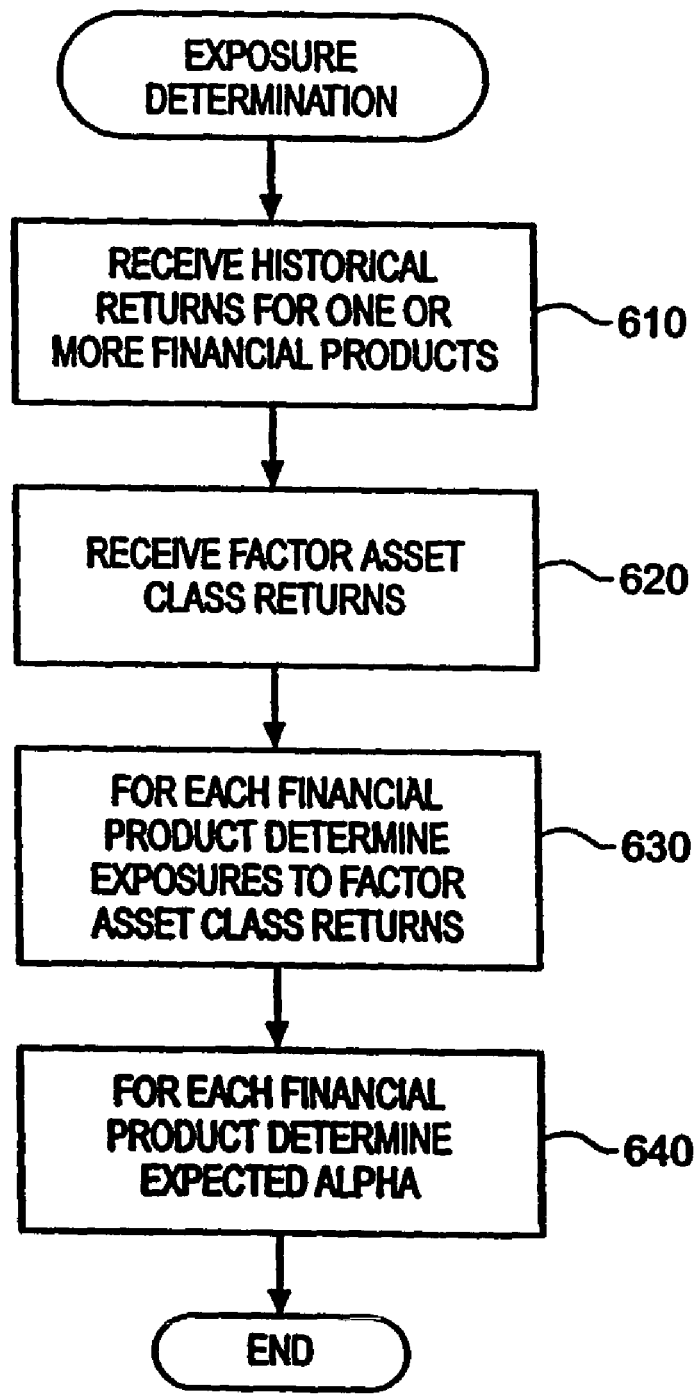
FIG. 6 is a flow diagram illustrating financial product exposure determination according to one embodiment of the present invention.

FIG. 6 is a flow diagram illustrating a method of determining a financial product's exposures to factor asset class returns according to one embodiment of the present invention. At step 610, the historical returns for one or more financial products to be analyzed are received. According to one embodiment, the financial product exposure module 315 may reside on a server device and periodically retrieve the historical return data from a historical database stored in another portion of the same computer system, such as RAM, a hard disk, an optical disc, or other storage device. Alternatively, the financial product exposure module 325 may reside on a client system and receive the historical return data from a server device as needed. At step 620, factor asset class returns are received.

At step 630, QP techniques or the like are employed to determine estimated exposures (the S coefficients) to the factor asset class returns.

At step 640, for each financial product, expected future alpha is determined for each subperiod of the desired scenario period. With regards to mutual funds or related financial products, for example, historical alpha alone is not a good estimate of future alpha. That is, a given mutual fund or related financial product will not continue to outperform/under perform its peers indefinitely into the future. Rather, empirical evidence suggests that over performance may partially persist over one to two years while under performance may persist somewhat longer (see for example, Carhart, Mark M. "On Persistence in Mutual Fund Performance." Journal of Finance, March 1997, Volume 52 No. 1, pp. 57-82).

For example, future alpha may depend upon a number of factors, such as turnover, expense ratio, and historical alpha. Importantly, one or more of these factors may be more or less important for particular types of funds. For example, it is much more costly to buy and sell in emerging markets as compared to the market for large capitalization US equities. In contrast, bond turnover can be achieved at a much lower cost, therefore, turnover has much less affect on the future alpha of a bond fund than an equity fund. Consequently, the penalty for turnover may be higher for emerging market funds compared to large cap U.S. equities and bond funds. Improved results may be achieved by taking into account additional characteristics of the fund, such as the fact that the fund is an index fund and the size of the fund as measured by total net assets, for example.

According to one embodiment of the present invention, a more sophisticated model is employed for determining future alpha for each fund:

$$\alpha_t = \alpha_{base} + \rho^t(\alpha_{historical} - \alpha_{base}) \quad \text{(EQ \#5)}$$

where, $\alpha_{base}$ is the baseline prediction for future Alpha of the fund $\rho$, Rho, governs the speed of decay from $\alpha_{historical}$ to $\alpha_{base}$ $\alpha_{historical}$ is Alpha estimated in Equation #4

According to one embodiment, $$\alpha_{base} = C + \beta_1 \text{Expense\_Ratio} + \beta_2 \text{Turnover} + \beta_3 \text{Fund\_Size} \quad \text{(EQ \#6)}$$

where the parameters are estimated separately for each of four different classes of funds: US equity, foreign equity, taxable bond, nontaxable bond. These parameters may be estimated using conventional econometric techniques, such as ordinary least squares (OLS). According to one embodiment, Rho is estimated by first calculating historical deviations from $\alpha_{base}$ ("residual alpha") and then estimating Rho as the first order serial correlation of the residual alpha series.

Portfolio Optimization

Portfolio optimization is the process of determining a set of financial products that maximizes the utility function of a user. According to one embodiment, portfolio optimization processing assumes that users have a mean-variant utility function, namely, that people like having more wealth and dislike volatility of wealth. Based on this assumption and given a user's risk tolerance, the portfolio optimization module 340 calculates the mean-variance efficient portfolio from the set of financial products available to the user. As described above, constraints defined by the user may also be taken into consideration by the optimization process. For example, the user may indicate a desire to have a certain percentage of his/her portfolio allocated to a particular financial product. In this example, the optimization module 340 determines the allocation among the unconstrained financial products such that the recommended portfolio as a whole accommodates the user's constraint(s) and is optimal for the user's level of risk tolerance.

Prior art mean-variant portfolio optimization traditionally treats the problem as a single period optimization. Importantly, in the embodiments described herein, the portfolio optimization problem is structured in such as way that it may explicitly take into account the impact of different investment horizons and the impact of intermediate contributions and withdrawals. Further the problem is set up so that it may be solved with QP methods.

Figure 7:
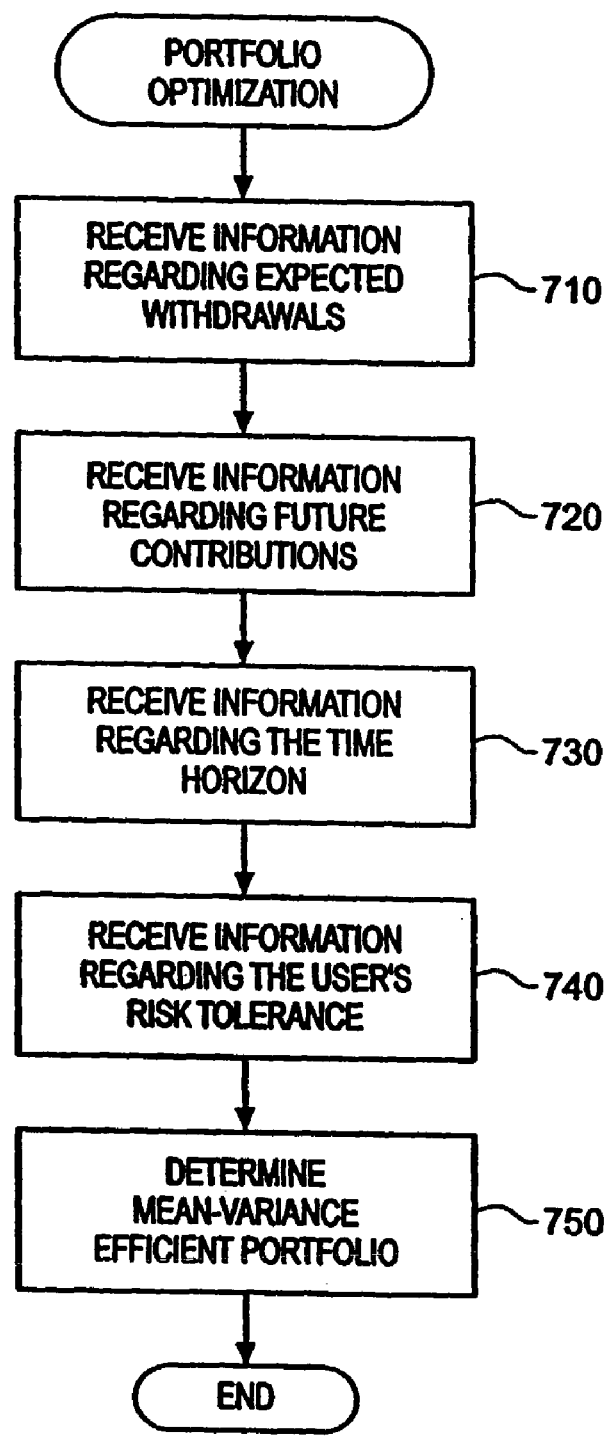
FIG. 7 is a flow diagram illustrating portfolio optimization according to one embodiment of the present invention.

Referring now to FIG. 7, a method of portfolio optimization according to one embodiment of the present invention will now be described. At step 710, information regarding expected withdrawals is received. This information may include the dollar amount and timing of the expected withdrawal. At step 720, information regarding expected future contributions is received. According to one embodiment, this information may be in the form of a savings rate expressed as a percentage of the user's gross income or alternatively a constant or variable dollar value may be specified by the user.

At step 730, information regarding the relevant investment time horizon is received. In an implementation designed for retirement planning, for example, the time horizon might represent the user's desired retirement age.

At step 740, information regarding the user's risk tolerance, Tau, is received.

At step 750, the mean-variance efficient portfolio is determined. According to one embodiment, wealth in real dollars at time T is optimized by maximizing the following mean-variance utility function by determining portfolio proportions ($X_i$):

$$U = E(W_T) - \frac{\text{Var}(W_T)}{\tau} \quad \text{(EQ \#7)}$$

where for a given scenario, $E(W_T)$ is the expected value of wealth at a time T $\text{Var}(W_T)$ is the variance of wealth at time T $\tau$ is the user's risk tolerance $$W_T = X_1 \sum_{t=0}^{T-1} C_t \prod_{j=t+1}^{T} (1 + R_{j1}) + \ldots + X_n \sum_{t=0}^{T-1} C_t \prod_{j=t+1}^{T} (1 + R_{jn}) + g \quad \text{(EQ \#8)}$$

where, $X_i$ represents the recommended constant proportion of each net contribution that should be allocated to financial product i.

$C_t$ represents the net contribution at time t, $R_{ji}$ represents the expected returns for financial product i in year j, n is the number of financial products that are available for optimization, g is the value of constrained assets for a given scenario, The product of gross returns represents the compounding of values from year 1 to the horizon. Initial wealth in the portfolio is represented by contribution $C_0$.

Importantly, the financial product returns need not represent fixed allocations of a single financial product. Within the context of the optimization problem, any individual asset return may be composed of a static or dynamic strategy involving one or more financial products. For example, one of the assets may itself represent a constant re-balanced strategy over a group of financial products. Moreover, any dynamic strategy that can be formulated as an algorithm may be incorporated into the portfolio optimization. For example, an algorithm which specifies risk tolerance which decreases with the age of the user could be implemented. It is also possible to incorporate path dependent algorithms (e.g., portfolio insurance).

According to Equation #8, contributions are made from the current year to the year prior to retirement. Typically, a contribution made at time t will be invested from time t until retirement. An exception to this would be if a user specifies a withdrawal, in which case a portion of the contribution may only be held until the expected withdrawal date.

An alternative to the buy and hold investment strategy assumed above would be to implement a "constant mix" investment strategy or re-balancing strategy. For purposes of this example, it is assumed that the recommended fixed target asset-mix will be held in an account for each year in the future. Therefore, each year, assets will be bought and/or sold to achieve the target. Let $f_i$ be the fraction of account wealth targeted for the i-th asset, then the sum of the fractions must equal one. In the following "evolution" equations, nominal wealth aggregation is modeled for a single taxable account from the current time t=0 to the time horizon t=T. It is assumed that "N" assets are in the account, labeled by the set of subscripts {i=1, . . . , N}. The superscripts minus and plus are used to distinguish between the values of a variable just before, and just after, "settlement". The settlement "event" includes paying taxes on distributions and capital gains, investing new contributions, buying and selling assets to achieve the constant mix, and paying load fees. For example, $W^+(t)$ is the total wealth invested in all assets just after settlement at time "t". The evolution equations for the pre- and post-settlement values, the "dollars" actually invested in each asset, are:

$$W_i^-(t) = \begin{cases} W_i^-(0), & t = 0, \\ [1 + R_i(t)] \cdot W_i^+(t-1) - \|k_i(t)\|, & 0 < t \le T, \end{cases} \quad (19a)$$

$$W_i^+(t) = \begin{cases} f_i \cdot W^+(t), & 0 \le t < T, \\ 0, & t = T. \end{cases} \quad (19b)$$

In the above equation, the double-bar operator $\|\ \|$ is equal to either its argument or zero, whichever is greater. From Eq. (19a), we see that the pre-settlement value at any time (after the initial time) is just the gross return on the post-settlement value of the previous time less the "positive-part" of any distribution, i.e. the "dividend". Here, $k_i(t)$ is the portion of the return of the i-th asset that is distributed, and $R_i(t)$ is the total nominal return on the i-th asset in the one-year period [t−1, t]. We also assume that an initial, pre-settlement value is given for each asset. Eq. (19b) defines the post-settlement value in terms of the asset's constant mix and the total account value after settlement. Since we "cash-out" the portfolio at the time horizon, the final amount in each asset at t=T is zero. The pre- and post-settlement, total values are governed by the pair of equations:

$$W^-(t) = \sum_{i=1}^N W_i^-(t), \quad 0 \le t \le T, \quad (19c)$$

$$W^+(t) = W^-(t) + C(t) + D(t) - L(t) - S(t), \quad 0 \le t \le T. \quad (19d)$$

In Eq. (19d), $C(t)$ is the nominal contribution to the account at time "t", $D(t)$ is the total of all distributed "dividends", $L(t)$ is the "leakage", the total amount paid in loads to both rebalance and to invest additional contributions, and $S(t)$ is the "shrinkage", the total amount paid in taxes on distributions and capital gains. We note that $W^+(T)$ is the final horizon wealth after all taxes have been paid. The value of $D(t)$, the total of all distributed dividends, is the sum of the positive distributions:

$$D(t) = \sum_{i=1}^N \|k_i(t)\|, \quad 0 \le t \le T. \quad (19e)$$

Similarly, the "leakage" $L(t)$ is the total amount of dollars paid in loads, and $L_i(t)$ is the number of dollars paid in loads on just the i-th asset. These individual loads depend on the front-end load fee (a rate) on the i-th asset.

$$L_i(t) = [l_i/(1-l_i)] \cdot \|W_i^+(t) - \|k_i(t)\| - W_i^-(t)\|, 0 \le t \le T. \quad (19f)$$

$$L(t) = \sum_{i=1}^N L_i(t), \quad 0 \le t \le T. \quad (19g)$$

If there is a short-term loss (negative distribution), the load fee paid on an asset's purchase is just a fixed fraction of the purchase price.[1] When there is a short-term gain (positive distribution), any part of it can be re-invested without fees, and fees need only be paid on purchases in excess of the gain. Note that at the horizon, the investment is "cashed out," and no load fees are paid.

[1] The dollar amount of a load fee is proportional to the ratio $l/(1-l)$. That's because our wealth variables are all measured as "net" loads. To see this, suppose we make a contribution c. After loads, we are left with $W=(1-l)c$. In terms of W, the amount we paid in loads is $L=lc=[l/(1-l)]W$.

The equation for the "shrinkage" $S(t)$, the total amount paid in taxes, has two terms. The first term is the tax on distributions and is multiplied by the marginal tax-rate; the second term is the tax on capital gains and is multiplied by the capital gains tax-rate.

In Eq. (19h), the capital gains tax depends on the basis $B_i(t)$, the total of all after-tax nominal-dollars that have been invested in the i-th asset up to time "t". Note that there can be either a capital gain or loss. The double-bar operator ensures that capital gains are triggered only when there is a sale of assets. At the horizon, we sell all assets, and automatically pay all taxes. The basis $B_i(t)$, evolves according to the following recursion equation:

$$B_i(t) = \begin{cases} B_i(0), & t = 0, \\ B_i(t-1) + \|W_i^+(t) - W_i^-(t)\| + L_i(t) - \\ [B_i(t-1)/W_i^-(t)] \cdot \|W_i^-(t) - W_i^+(t)\|, & 0 < t \le T. \end{cases} \quad (19i)$$

Note that all new purchases are made with after-tax dollars, and add to the basis; all sales decrease the basis. Further, any load paid to purchase an asset adds to the basis. We assume that the initial basis $B_i(0)$ of an asset is either given, or defaults to the initial, pre-settlement value so that the average basis is initially equal to one.

A "constitutive" equation for $k_i(t)$ is needed to complete our system of equations. Short-term distributions depend on the "type" of asset; here we model mutual funds:

$$k_i(t) = \begin{cases} k_i(0), & t = 0, \\ \kappa_i \cdot R_i(t) \cdot W_i^+(t-1), & 0 < t \le T. \end{cases} \quad (20a)$$

$$S(t) = \tau_m \cdot \sum_{i=1}^N k_i(t) + \quad (19h)$$

$$\tau_{cg} \cdot \sum_{i=1}^N [1 - B_i(t-1)/W_i^-(t)] \cdot \|W_i^-(t) - W_i^+(t)\|, \quad 0 \le t \le T.$$

Often, we set the initial distribution to zero, and assume that the asset's initial pre-settlement value has already accounted for any non-zero, initial value. We note that the distribution is proportional to the amount of wealth at "stake" during the prior-period. For mutual funds, we assume that the distribution is a fraction $\kappa_i$ of the prior-period's total return, and therefore is also proportional to $R_i(t)$. Note that the distribution in Eq. (20a) can be a gain (positive) or a loss (negative). In contrast, the constitutive equation for stocks takes the form:

$$k_i(t) = \begin{cases} k_i(0), & t = 0, \\ \kappa_i \cdot [1 + R_i(t)] \cdot W_i^+(t-1), & 0 < t \le T. \end{cases} \quad (20b)$$

In the above formulas, mutual funds have a simple distribution model consisting of a single rate taxed at the marginal rate. In other embodiments, an equity mutual fund has four possible annual distributions: qualified and non-qualified dividends and long- and short-term capital gains.

For stocks, the proportionality constant $\kappa_i$ models a constant dividend "yield", and the distribution is always a gain (non-negative). For stocks (mutual funds), the distribution is proportional to the gross (simple) return.

Before we leave this section, a word on 401(k) plans and IRA's (with no load funds). For these accounts, the loads and taxes may be ignored, and there is no basis in the asset. At "settlement", the user just re-balances their account. The evolution equations for these accounts is trivial in comparison to the equations for a general taxable account:

$$W_i^+(t) = f_i f_i \cdot W^+(t), \quad 0 \le t \le T, \tag{21a}$$

$$W^+(t) = \begin{cases} W^+(0), & t = 0, \\ \left(1 + \sum_{i=1}^{N} f_i \cdot R_i(t)\right) \cdot W^+(t-1) + C(t), & 0 < t \le T. \end{cases} \tag{21b}$$

At the time horizon T, the total wealth in a tax-deferred account (e.g., a 401(k) plan or a traditional IRA) is just $W^+(T)$. This is a pre-withdrawal total value. When retirement withdrawals are made from a tax-deferred account, they are taxed at the client's average tax-rate, $\rho_a$. Therefore, the "after-tax" equivalent value is equal to "pre-tax" wealth $W^+(T)$ times the tax factor $(1-\tau_a)$.

In one embodiment, taxable and tax-deferred accounts are aggregated to get total portfolio wealth by choosing tax-deferred accounts as a baseline. If all the funds in a tax-deferred account were converted to an annuity, and the annuity payments were taken as withdrawals, then the withdrawals would mimic a salary subject to income taxes. This is precisely the client's pre-retirement situation. Before aggregating a taxable account, its "after-tax" value may be scaled to this baseline using the formula:

$$W_{baseline} = W_{after-tax}/(1-\tau_a). \tag{22}$$

Essentially, in accordance with one embodiment of the present invention, the baseline equivalent is obtained by grossing up values using the average tax-rate.

The evolution equation variables appear "implicitly" in the recursion $$W^+(t) = W^+(t-1) \cdot \sum_{i=1}^{N} f_i \cdot [1 + R_i(t)] - \sum_{i=1}^{N} f_i \cdot [l_i/(1-l_i)] \cdot \|W^+(t) - [1 + R_i(t)] \cdot W^+(t-1)\|. \tag{23}$$

relations. Hence, we need to "iterate" at each time step to solve for "explicit" variable values.[2] We illustrate this process with an example. Consider the simple case where there are no distributions, contributions, or taxes; just loads, and a constant-mix strategy. Here, the evolution equations simplify to a single equation for the total, after-settlement wealth $W^+(t)$:

[2] In practice a robust root-finding algorithm may be used rather than iteration. Note, we only know $W^+(t)$ as an implicit function of $W^+(t-1)$, but given a guess for its value, we can refine the guess by substituting it into the right-side of Eq. (23).

It's instructive to re-write Eq. (23) as the pair of equations in terms of an "effective" return $R_e(t)$:

$$W^+(t) = [1 + R_e(t)] \cdot W^+(t-1), \tag{24a}$$

$$R_e(t) = \sum_{i=1}^{N} f_i \cdot R_i(t) - \sum_{i=1}^{N} f_i \cdot [l_i/(1-l_i)] \cdot \|R_e(t) - R_i(t)\|. \tag{24b}$$

Eq. (24a) is the evolution equation for a single asset with the effective return. Eq. (24b) is an implicit equation for the effective return $R_e(t)$ in terms of the asset returns $R_i(t)$. We solve for the effective return using iteration. When the loads are equal to zero, as expected, the effective return is just a weighted-average of the asset returns. Even when the loads are not zero, this average return is a good initial guess for the iteration procedure. In fact, using the average return as the initial guess and iterating once yields the following explicit approximation for the effective return:

$$R_{wgt}(t) = \sum_{i=1}^{N} f_i \cdot R_i(t), \tag{25a}$$

$$R_e(t) \approx R_{wgt}(t) - \sum_{i=1}^{N} f_i \cdot l_i \|R_{wgt}(t) - R_i(t)\|. \tag{25b}$$

Eq. (25b) is consistent with our intuition, and agrees well with higher order iterates.

To determine the mutual fund input moments we must first calculate the kernel moments. This procedure calculates successive annual kernel moments and averages the result. The resulting mean and covariance matrix is then utilized by the reverse optimization procedure and also as an input into the optimization procedure.

To calculate analytic core moments, first we must describe the wealth for each core asset for an arbitrary holding period. For each of the core assets, the resulting wealth from an arbitrary investment horizon can be written as: [Note, this is an approximation for equities]

$$W_{t,T} = \exp\left\{\sum_{j=t}^{T-1} a + bX_{j+1} + c\Pi_{j+1} + d\delta_{j+1} + eX_j + f\Pi_j + g\delta_j\right\}$$

Where:
  a, b, c, d, e, f, g=Constants
  $X_j$=Real rate in year j
  $\Pi_j$=Inflation rate in year j
  $\delta_j$=Dividend growth rate in year j The expectation of wealth for any of the core assets given information at time zero is then:

$$E_0 W_{t,T} = e^{a(T-t)} E_0 e^{\sum_{j=t}^{T-1} eX_j + bX_{j+1}} E_0 e^{\sum_{j=t}^{T-1} f\Pi_j + c\Pi_{j+1}} E_0 e^{\sum_{j=t}^{T-t} g\delta_j + d\delta_{j+1}}$$

Since X, Π, and δ are independent, we can deal with each of these expectations separately. For example, consider the contribution in the above equation from inflation. The summation can be rewritten as:

$$E_0 \exp\left\{\sum_{j=t}^{T-1} f\Pi_j + c\Pi_{j+1}\right\} = E_0 \exp\left\{f\Pi_t + \left(\sum_{j=t+1}^{T-1} (f+c)\Pi_j\right) + c\Pi_T\right\}$$

Next, we need to use iterated expectations to determine this expectation. We can write the expectation at time zero as the repeated expectation over the various innovations. For example, the equation for inflation can be rewritten as:

$$E_0 \exp\left\{f\Pi_t + \left(\sum_{j=t+1}^{T-1} (f+c)\Pi_j\right) + c\Pi_T\right\} =$$

$$E_{\varepsilon_1} E_{\varepsilon_2} \ldots E_{\varepsilon_T} \exp\left\{f\Pi_t + \left(\sum_{j=t+1}^{T-1} (f+c)\Pi_j\right) + c\Pi_T\right\} =$$

$$E_{\varepsilon_1} E_{\varepsilon_2} \ldots E_{\varepsilon_{T-1}} \exp\left\{f\Pi_t + \left(\sum_{j=t+1}^{T-1} (f+c)\Pi_j\right)\right\} E_{\varepsilon_T}[e^{c\Pi_T}]$$

Assuming inflation follows a modified square root process:

$$\Pi_t = \mu_\pi + \rho_\pi \Pi_{t-1} + \sigma_\pi \sqrt{\|\Pi_{t-1}\|} \varepsilon_t$$

Where $\|\;\|$ denotes the Heaviside function $$\|\Pi_t\| \equiv \begin{cases} 0 & \text{if } \Pi_t \leq 0 \\ \Pi & \text{if } \Pi_t > 0 \end{cases}$$

Now we recursively start taking the expectations over epsilon starting at the end and working backward. So:
Where the approximation is due to the Heaviside function.

$$E_{\varepsilon_T}[e^{c\Pi_T}] = E_{\varepsilon_T}[e^{c\mu_\pi + c\rho_\pi \Pi_{T-1} + c\sigma_\pi \sqrt{\|\Pi_{T-1}\|} \varepsilon_T}]$$

$$\approx e^{c(\mu_\pi + \rho_\pi \Pi_{T-1} + \frac{1}{2} c \sigma_\pi^2 \Pi_{T-1})}$$

Combining this with the above equation yields:

$$E_{\varepsilon_1} E_{\varepsilon_2} \ldots E_{\varepsilon_{T-1}} \exp\left\{f\Pi_t + \left(\sum_{j=t+1}^{T-1} (f+c)\Pi_j\right)\right\} E_{\varepsilon_T}[e^{c\Pi_T}] = E_{\varepsilon_1} E_{\varepsilon_2} \ldots$$

$$E_{\varepsilon_T} \exp\left\{f\Pi_t + \left(\sum_{j=t+1}^{T-1} (f+c)\Pi_j\right)\right\} E_{\varepsilon_{T-1}}\left[e^{c\mu_\pi + (c\rho_\pi + \frac{1}{2} c^2 \sigma_\pi^2 + c + f)\Pi_{T-1}}\right]$$

In general for any time period t, an exponential linear function of Π has the following expectation:

$$E_{\varepsilon_t}[e^{A_j + B_j \Pi_t}] = E_{\varepsilon_t}[e^{A_j + B_j(\mu_\pi + \rho_\pi \Pi_{t-1} + \sigma_\pi \|\Pi_{t-1}\| \varepsilon_t)}]$$

$$= e^{A_j + B_j \mu_\pi + B_j \Pi_{t-1}(\rho_\pi + \frac{1}{2} \sigma_\pi^2 B_j)}$$

$$= e^{A_j + B_j \mu_\pi + (B_j(\rho_\pi + \frac{1}{2} \sigma_\pi^2 B_j))\Pi_{t-1}}$$

$$= e^{A_{j-1} + B_{j-1} \Pi_{t-1}}.$$

An exponential linear function of Π remains exponential linear after taking the expectation. This invariance allows for the backward recursion calculation. Only the constant (A) and the slope (B) are changing with repeated application of the expectation operator. The evolution of A and B can be summarized as $$A_J = A_{J+1} + \mu_\pi B_{J+1}$$

$$B_J = B_{J+1}\left[\rho_\pi + \frac{1}{2}\sigma_\pi^2 B_{J+1}\right]$$

In addition, the $B_J$ coefficient has to be increased by (c+f) to account for the additional $\Pi_j$ term in the summation. To implement this recursive algorithm to solve for expected wealth, first define the following indicator variable:

$$I(t_1, t_2) = \begin{cases} 1 & \text{if } t_1 \leq j \leq t_2 \\ 0 & \text{Otherwise} \end{cases}$$

Next, the following algorithm may be employed:
Initial Conditions: J=T, $A_T$=0, $B_T$=c
(1) J=J−1

$$A_J = A_{J+1} + \mu_\pi B_{J+1} \qquad (2)$$

$$B_J = B_{J+1}\left[\rho_\pi + \frac{1}{2}\sigma_\pi^2 B_{J+1}\right] + c \cdot I(t+1, T-1) + f \cdot I(t, T-1)$$

(3) if J=0, End $$E(W_{t,T}) = e^{A_1 + B_1 \Pi_0}$$

(4) Go To (1)

The same technique applies to X since it is also a square root process. A similar technique can be used to create a recursive algorithm for the δ component. The only difference is that δ is an AR(1) process instead of a square root process. In particular, $$\delta_t = \mu_\delta + \rho_\delta \delta_{t-1} + \sigma_\delta \varepsilon_t$$

For this AR(1) process, the expectation is of the following form.

$$E_{\varepsilon_t}[e^{A_j + B_j \delta_t}] = E_{\varepsilon_t}[e^{A_j + B_j(\mu_\delta + \rho_\delta \delta_{t-1} + \sigma_\delta \varepsilon_t)}]$$

$$= e^{A_j + B_j \mu_\delta + \frac{1}{2}\sigma_\delta^2 B_j + B_j \rho_\delta \delta_{t-1}}$$

$$= e^{A_{j-1} + B_{j-1} \delta_{t-1}}$$

The evolution of A and B is thus summarized as:

$$A_J = A_{J+1} + B_{J+1}\left(\mu_\delta + \frac{1}{2}\sigma_\delta^2\right)$$

$$B_J = B_{J+1} \rho_\delta$$

The recursive relationship for δ is then:
Initial Conditions: J=T, $A_T=0$, $B_T=d$
(1) J=J-1

$$A_J = A_{J+1} + B_{J+1}\left(\mu_\delta + \frac{1}{2}\sigma_\delta^2\right) \quad (2)$$

$$B_J = B_{J+1}\rho_\delta + d \cdot I(t+1, T-1) + g \cdot I(t, T-1)$$

(3) if J=0, End
$E(W_{t,T})=e^{A_1+B_1\delta_0}$
(4) Go To (1)

This framework for calculating expected wealth can also be used to calculate the variance of wealth for an arbitrary holding period. From the definition of variance, we have:

$$V_0(W_{t,T})=E_0(W_{t,T}^2)-E_0(W_{t,T})^2$$

but $$W_{t,T}^2 = \left[\exp\left\{\sum_{j=t}^{T-1} a + bX_{j+1} + c\Pi_{j+1} + d\delta_{j+1} + eX_j + f\Pi_j + g\delta_j\right\}\right]^2$$

$$= \exp\left\{\sum_{j=t}^{T-1} 2(a + bX_{j+1} + c\Pi_{j+1} + d\delta_{j+1} + eX_j + f\Pi_j + g\delta_j)\right\}$$

So the same technique can be used with a simple redefinition of the constants to be twice their original values. Similarly, the covariance between any two core assets can be calculated by simply adding corresponding constants and repeating the same technique.

For the current parameter values, the constants for Bills, Bonds, and Equities are:

|  | a | b | c | d | e | F | g |
|---|---|---|---|---|---|---|---|
| Bills | 0.0077 | 0 | -1 | 0 | 1 | 0.7731 | 0 |
| Bonds | 0.0642 | -2.5725 | -3.8523 | 0 | 2.5846 | 2.9031 | 0 |
| Equities | 0.0331 | -2.4062 | -3.7069 | 4.4431 | 2.48 | 2.79 | -3.5487 |

Above, a methodology was described for calculating core asset analytic moments for arbitrary horizons. This section describes how these moments are translated into annualized moments. The procedure described in this section essentially calculates successive annual moments for a twenty (20) year horizon and computes the arithmetic average of these moments. These 'effective' annual moments may then be used as inputs into the reverse optimization procedure and the individual optimization problem.

For this calculation, first make the following definitions:
$M_t^j$=Expected return for $j^{th}$ asset over the period t, t+1
$Cov_t^{i,j}$=Covariance of returns on asset i with asset j over the period t, t+1

These expected returns and covariance are calculated using the formulas described above. The effective annual expected return for asset j is then calculated as:

$$M^j = \sum_{t=1}^{T} \omega_t M_t^j$$

Similarly, the effective annual covariance between returns on asset i and returns on asset j are calculated as: (Note, the weights, $\omega_t$, are between zero and one, and sum to one.)

$$Cov^{i,j} = \sum_{t=1}^{T} \omega_t Cov_t^{i,j}$$

In one embodiment, this annualizing technique could be personalized for a given user's situation. For example, the user's horizon could specify T, and their level of current wealth and future contributions could specify the relevant weights. However for purposes of illustration, the relevant 'effective' moments for optimization and simulation are computed assuming a horizon of 20 years (T=20), and equal weights (i.e. 1/T).

The techniques described in this section allow for the calculation of the following effective annual moments:

| Output parameter name | Description | Units |
|---|---|---|
| $M^1$ | Bills: expected return | Return per year |
| $M^2$ | Bonds: expected return | Return per year |
| $M^3$ | Equity: expected return | Return per year |
| $Cov^{1,1}$ | Bills: variance of returns | (Return per year)$^2$ |
| $Cov^{2,2}$ | Bonds: variance of returns | (Return per year)$^2$ |
| $Cov^{3,3}$ | Equity: variance of returns | (Return per year)$^2$ |
| $Cov^{1,2}$ | Bills and Bonds: covariance | (Return per year)$^2$ |
| $Cov^{1,3}$ | Bills and Equity: covariance | (Return per year)$^2$ |
| $Cov^{2,3}$ | Bonds and Equity: covariance | (Return per year)$^2$ |

Exemplary methods, which may be used in accordance with various embodiments of the present invention, will now be described for (i) equilibrating mutual fund returns between taxable and tax advantaged accounts when the mutual fund is perfectly tax efficient (i.e., retains all capital gains); and (ii) adjusting mutual fund returns when the mutual fund is not perfectly tax efficient (i.e., pays out dividends, short or long-term capital gains). Mutual Funds held in taxable accounts pay taxes on gains differentially from the same asset held in tax advantaged accounts, such as Roth or traditional IRAs. The discussion below describes a method for calculating a single return adjustment that equilibrates the tax treatment between the different account types.

Mutual funds can differ in their ultimate tax efficiency in two fundamental ways. Mutual funds can help investors pay taxes at a lower tax rate or help investors defer paying taxes as long as possible. Mutual funds that retain their capital gains benefit investors by delaying tax payments on gains. Likewise, mutual funds that avoid dividend and short-term capital gain distributions help investors avoid paying taxes at ordinary income tax rates (which are generally much higher than long-term capital gain tax rates). A mutual fund's tax efficiency may thus be determined by its propensity to avoid early taxable distributions and by its ability to distribute gains that are taxed at the desirable long-term rate.

First, return adjustments will be discussed for tax-efficient "buy" and "sell" assets. According to one embodiment, a tax-adjusted return for a "buy" asset is calculated by equating means of two wealth processes (see equation #26 below) where the right side pays taxes and the left side has an adjusted return, and pays no taxes. The right hand side represents today's investment in the asset that grows according to the asset's return process. Along the way, taxes on distributions are paid and after T years, it is liquidated and capital gains taxes are paid (initial wealth equals initial basis).

The general formula for tax-adjusted return is discussed further below. For purposes of illustration, a formula will first be described for the simpler case of only capital gains. For tax-efficient assets with no distributions (only unrealized capital gains/losses for returns) the following (approximate) equation of probability distributions applies, where α is a constant to be determined:

$$R_t = R_t^{nom} = \text{nominal asset return at time } t \qquad \text{EQ \#26}$$

$$a = a^{nom} = \text{adjustment to nominal mean}$$

$$W = B = \text{wealth at full basis}$$

$$\tau_{avg} = \text{average tax rate in retirement}$$

$$\tau_{cg} = \text{long term capital gains tax rate}$$

$$\prod_{t=1}^{T}(1+R_t+a)W \approx (1-\tau_{cg})\prod_{t=1}^{T}(1+R_t)W + \tau_{cg}B$$

To solve for α, one takes the expected values of both sides of the equation, and solve for a. Note, for purposes of this approximation, it is assumed that returns are not serially correlated.

$$E = E^{nom} = \text{nominal expected return of asset}$$

$$(1+E+a)^T = (1-\tau_{cg})(1+E)^T + \tau_{cg}$$

$$a = [(1-\tau_{cg})(1+E)^T + \tau_{cg}]^{1/T} - 1 - E$$

Compute an approximation (to help in deducing properties of the adjustment):

$$a = (1+E)\left[\left[1-\tau_{cg}+\frac{\tau_{cg}}{(1+E)^T}\right]^{1/T}-1\right]$$

$$a \approx -(1+E)\frac{\tau_{cg}}{T}\left(1-\frac{1}{(1+E)^T}\right).$$

Selling an asset differs somewhat from buying an asset because selling may involve triggering a taxable event. The following discussion accounts for the possibility of a taxable event impacting the desirability of an asset sale (note in general accumulated capital gains makes a sale less desirable while accumulated capital losses makes a sale more desirable than the baseline 'buy' scenario).

According to one embodiment, a tax-adjusted return of a "sell" asset may be similarly calculated with one change that is motivated by the following accounting "trick." "Liquidate" the asset and compute the full-basis, after-tax dollars available for investing in other assets by "paying" capital gains taxes on unrealized gains (or in the case of an unrealized loss, get a "rebate"). The tax rate is either the long term capital gains rate (for assets held 12 months or longer) or the marginal rate (for assets held less than 12 months). For cases when the basis is larger than the wealth, the situation is complicated by the need to match losses with gains or be limited by annual loss limits (with carry-overs to subsequent years). For simplicity, in the following examples the marginal or long term capital gains rate may be used. Since this separation into long and short is associated with "lot accounting," the subscript "lot" will be used to denote appropriate tax rate.

$$\tau_{lot} = \begin{cases} \tau_{cg} & \text{if assets are held 12 months or long} \\ \tau_m & \text{if assets are held less than 12 months} \end{cases}$$

$$W^{jhot} = (1-\tau_{lot})W + \tau_{lot}B = \text{full} - \text{basis},$$

after − tax dollars available for investing

Investing the full-basis, after-tax money in a new ("buy") asset may yield a tax adjusted return calculated above. However, investing this money in the original asset means that taxes do not have to be paid (immediately) so the right hand side of the equation uses the original wealth W and original basis B. The left hand side of the equation has the full-basis, after-tax money as its initial state. Again, the assumption is made that this is a tax efficient asset that pays no distributions.

$$\prod_{t=1}^{T}(1+R_t+a)W^{jhot} \approx (1-\tau_{cg})\prod_{t=1}^{T}(1+R_t)W + \tau_{cg}B$$

$$\prod_{t=1}^{T}(1+R_t+a)[(1-\tau_{lot})W+\tau_{lot}B] \approx (1-\tau_{cg})\prod_{t=1}^{T}(1+R_t)W + \tau_{cg}B$$

Take expected values and solve for the constant α.

$$(1+E+a)^T\left[(1-\tau_{lot})+\tau_{lot}\frac{B}{W}\right] = (1-\tau_{cg})(1+E)^T + \tau_{cg}\frac{B}{W}$$

$$a = \left[\frac{(1-\tau_{cg})(1+E)^T + \tau_{cg}\frac{B}{W}}{\left[1-\tau_{lot}+\tau_{lot}\frac{B}{W}\right]}\right]^{1/T} - 1 - E$$

$$\Gamma = \tau_{lot}(1-B/W)$$

Compute an approximation (to help in deducing properties of the reduction):

$$a = (1+E)\left[\left[\frac{1-\tau_{cg}+\frac{\tau_{cg}}{(1+E)^T}\frac{B}{W}}{1-\Gamma}\right]^{1/T} - 1\right]$$

$$a = (1+E)\left[\left[1+\frac{\Gamma-\tau_{cg}+\frac{\tau_{cg}}{(1+E)^T}\frac{B}{W}}{1-\Gamma}\right]^{1/T} - 1\right]$$

$$a \approx -(1+E)\frac{\tau_{cg}}{T}\left[\frac{\left(1-\frac{1}{(1+E)^T}\right)\frac{B}{W}}{1-\Gamma}\right] \quad \text{if } \tau_{lot}=\tau_{cg}$$

Turning now to nominal return adjustments for general "buy" and "sell" assets, a single formula that can calculate the tax-adjusted return in the general case in accordance with an embodiment of the present invention will be described. This formula extends the formulas in the previous section. To calculate the return adjustment for a general asset, it may suffice to first compute the tax and basis adjustments associated with annual distributions, then write the equation for a "sell" asset return adjustment and solve. Note for purposes of illustration, the following formulas assume dividends are taxed at the marginal rate. Those skilled in the art will understand how to adjust these formulas to account for taxation of qualified dividends at lower rates. In other embodiments, both a return and a volatility adjustment can be calculated and used.

To get the "buy" asset return adjustment, the basis B may be set equal to the wealth W. As before, the means of two wealth processes may be equated, where the right side pays taxes and the left side has an adjusted return, and pays taxes only initially (to get available investable dollars). The right hand side represents today's investment in the asset that grows according to the asset's return process. Along the way, taxes on distributions are paid and after T years, it is liquidated and capital gains taxes are paid (initial wealth equals initial basis).

First, taxes are computed from distributions and the consequent basis adjustments.

$d^{div}$=dividend distribution rate
$d^{short}$=short term capital gains distribution rate
$d^{long}$=long term capital gains distribution rate
$\tau_m$=marginal tax rate
$\tau_{cg}$=cap gains tax rate
$(d^{div}+d^{short}+d^{long})W = \epsilon W$=taxable distributions
$(\tau_m(d^{div}+d^{short})+\tau_{cg}d^{long})W = \eta W$=taxes paid on distribution
$(\epsilon-\eta)W$=distribution after paying taxes
$R_t-\eta$=annual return after paying taxes on distributions Update the basis:
$B_0=B$=initial basis
$B_1=B_0+(\epsilon-\eta)W$=wealth after paying taxes on first year's distribution $\epsilon W$.
$W_1=(1+R_1-\eta)W$=wealth after paying taxes on first year's distribution
$\epsilon W_1=\epsilon(1+R_1-\eta)W$=second year's distribution
$B_2=B_0+(\epsilon-\eta)W+(\epsilon-\eta)(1+R_1-\eta)W$=basis after paying taxes on first and second year's distributions.

$$B_T = B + (\varepsilon - \eta)\sum_{t=1}^{T} W \prod_{k=1}^{k-1}(1+R_t-\eta) = \text{ending basis where,}$$

$$\text{by definition} \prod_{k=1}^{0}(\text{anything}) = 0$$

$$\prod_{t=1}^{T}(1+R_t+a)W^{final} \approx (1-\tau_{cg})\prod_{t=1}^{\gamma}(1+R_t-\eta)W +$$

$$\tau_{cg}\left(B+(\varepsilon-\eta)\sum_{t=1}^{\tau}W\prod_{k=1}^{k-1}(1+R_k-\eta)\right)$$

$$\prod_{t=1}^{\tau}(1+R_t+a)[(1-\tau_{lot})W+\tau_{lot}B] \approx$$

$$(1-\tau_{cg})\prod_{t=1}^{\tau}(1+R_t-\eta)W + \tau_{cg}(B+\varepsilon-\eta)\sum_{t=1}^{\tau}W\prod_{k=1}^{k-1}(1+R_t-\eta))$$

Take expected values and solve for the constant α.

$$(1+E+a)^T[(1-\tau_{lot})W+\tau_{lot}B] = (1-\tau_{cg})(1+E-\eta)^TW +$$

$$\tau_{cg}\left(B+(\varepsilon-\eta)\sum_{t=1}^{T}W(1+E-\eta)^{t-1}\right)(1+E+a)^T\left[1-\tau_{lot}+\tau_{lot}\frac{B}{W}\right] =$$

$$(1-\tau_{cg})(1+E-\eta)^T + \tau_{cg}\left(\frac{B}{W}+(\varepsilon-\eta)\frac{(1+E-\eta)^T-1}{E-\eta}\right)$$

$$a^{nom}\left(E^{nom}, \frac{B}{W}, d^{div}, d^{short}, d^{long}, \tau_{lot}, \tau_{cg}, \tau_m, T\right) =$$

-continued $$\left[\frac{(1-\tau_{cg})(1+E^{nom}-\eta)^T + \tau_{cg}\left(\frac{B}{W}+(\varepsilon-\eta)\frac{(1+E-\eta)^T-1}{E-\eta}\right)}{\left[1-\tau_{lot}+\tau_{lot}\frac{B}{W}\right]}\right]^{1/T} -$$

$$1-E^{nom}.$$

By describing an appropriate way of adjusting returns based on the relative tax efficiency of different investment options, this technique allows tax considerations to be incorporated into a general investment optimization problem. Given the above adjustments, mutual funds with higher expected returns but lower tax efficiency can be analyzed to determine if their excess returns outweighs their inherent tax inefficiencies.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    one or more processors of one or more computer systems receiving information regarding each financial product of a set of one or more financial products available for investment in a plurality of accounts of an investor having different tax treatment, the plurality of accounts including a taxable account and a tax deferred account;
    the one or more processors receiving information regarding current investments held in the taxable account and the tax deferred account, including information regarding an actual amount of unrealized capital gains associated with each financial product that is part of the current investments held, wherein the actual amount is positive for at least one financial product that is part of the current investments held;
    the one or more processors determining one or more tax characteristics associated with each financial product in the set of one or more financial products by evaluating one or more of information regarding distributions by the financial product and information regarding turnover associated with the financial product; and
    the one or more processors formulating advice regarding a recommended portfolio of financial products from the set of one or more financial products, the advice including a recommendation with respect to which of the taxable account and the tax deferred account each financial product in the recommended portfolio should be held by performing a portfolio optimization process that selects the financial products for inclusion in the recommended portfolio based at least in part upon the information regarding the current investments, the one or more tax characteristics, one or more relevant financial circumstances of the investor and tax implications of holding the one or more financial products in the taxable account versus the tax deferred account.

2. The method of claim 1, wherein said determining one or more tax characteristics comprises assigning weights to each of a plurality of mutual funds of the set of one or more financial products available for investment by preferring mutual funds with a tax characteristic indicating tax efficiency and using the weights to divide wealth among the plurality of mutual funds.

3. The method of claim 1, wherein said determining one or more tax characteristics comprises:
estimating assets owned by a mutual fund of the set of one or more financial products available for investment based on historical fund performance; and
determining a tax characteristic of the mutual fund based on whether the estimated assets have a propensity to be taxed at a marginal tax rate or a long-term capital gains rate.

4. The method of claim 3, wherein said determining one or more tax characteristics comprises setting a tax characteristic to indicate low tax efficiency if the assets are estimated to comprise income-generating securities or dividend-paying equities.

5. The method of claim 1, wherein said determining one or more tax characteristics comprises:
observing a turnover of a mutual fund of the set of one or more financial products available for investment; and
setting a tax characteristic of the mutual fund based on the observation.

6. The method of claim 5, wherein said determining one or more tax characteristics comprises setting a tax characteristic to indicate low tax efficiency if the turnover is high.

7. The method of claim 1, wherein said determining one or more tax characteristics comprises:
observing historical taxable distributions of a mutual fund of the set of one or more financial products available for investment; and
determining a tax characteristic of the mutual fund based on the observation.

8. The method of claim 7, wherein said determining one or more tax characteristics comprises determining a tax characteristic to indicate low tax efficiency if the historical taxable distributions are high.

9. The method of claim 7, wherein the historical taxable distributions comprise dividends.

10. The method of claim 1, wherein a relevant financial circumstance of the one or more relevant financial circumstances comprises a marginal tax rate of the investor.

11. The method of claim 1, wherein at least one of the set of one or more financial products is a municipal bond mutual fund, and the one or more relevant financial circumstances include a marginal state tax rate of the investor.

12. The method of claim 2, further comprising placing wealth allocated to each mutual fund of the plurality of mutual funds into one or more of the plurality of accounts based on the tax treatment of the plurality of accounts.

13. The method of claim 12, wherein the plurality of accounts include one or more of a taxable brokerage account, an individual retirement account (IRA), an individual tax-advantaged account, an employer-sponsored account, a 401(k) account and a 403(b) account.

14. A method of financial product selection comprising:
one or more processors of one of more computer systems dividing available wealth in a portfolio to be invested by an investor into a new money pool and an old money pool, the new money pool representing a portion of the available wealth not previously invested, and the old money pool representing a portion of the available wealth already invested; and
the one or more processors determining a recommended portfolio of financial products available to the investor for investment in one or more accounts by selecting the financial products with a portfolio optimization process that implements an old money strategy and a new money strategy, the old money strategy allocating the available wealth in the old money pool among the available financial products (i) based at least in part upon an actual amount of unrealized capital gains on individual investments currently owned by the investor, wherein the actual amount is positive for at least one individual investment and (ii) taking into consideration tax effects of transactions during the portfolio optimization process, the new money strategy allocating the available wealth in the new money pool among the available financial products.

15. The method of claim 14, wherein the old money strategy comprises giving capital loss assets full basis.

16. The method of claim 14, wherein the old money strategy comprises using minimum investment constraints to guard against transaction costs outweighing transaction gains.

17. The method of claim 14, wherein the new money strategy comprises giving all assets full basis.

18. The method of claim 14, wherein said selecting the financial products comprises selecting the financial products according to a combined strategy wherein the combined strategy uses new contributions to rebalance the portfolio.

19. A method comprising:
one or more processors of one or more computer systems receiving information regarding each of a plurality of financial products available for investment by an investor in a plurality of accounts, including at least one taxable account of the investor and at least one tax-deferred account of the investor;
the one or more processors receiving information regarding an amount of wealth of the investor that is available for investment including information regarding current investments held in each of the plurality of financial products and in which of the plurality of accounts;
the one or more processors programmatically determining one or more tax characteristics associated with each of the plurality of financial products by evaluating one or more of information regarding distributions by the financial product and information regarding turnover associated with the financial product;
the one or more processors programmatically determining a recommended portfolio of one or more financial products of the plurality of financial products and appropriate allocations among the one or more financial products by performing a portfolio optimization process that selects the one or more financial products for inclusion in the recommended portfolio based at least in part upon the current investments, the one or more tax characteristics of each of the plurality of financial products, one or more relevant financial circumstances of the investor, an actual amount of unrealized capital gains associated with each of the current investments, wherein the actual amount is positive for at least one investment of the current investments;
the one or more processors programmatically determining an account recommendation with respect to which of the plurality accounts each of the one or more financial products in the recommended portfolio should be held based on tax implications for the investor; and
the one or more processors formulating advice for the investor based on the recommended portfolio and the account recommendation.

20. The method of claim 19, wherein the plurality of financial products includes stocks, bonds and mutual funds.

21. The method of claim 20, further comprising:
dividing the available wealth into a new money pool and an old money pool, the new money pool representing a portion of funds not previously invested, and the old money pool representing a portion of funds already invested; and wherein said programmatically determining a recommended portfolio involves allocating the available wealth in the old money pool according to an old money strategy, which takes into consideration capital gains on investments currently owned by the investor, and allocating the available wealth in the new money pool according to a new money strategy.

22. The method of claim 20, wherein the portfolio optimization process adjusts returns for those of the plurality of financial products held in the at least one taxable account to take into consideration expected tax effects for both accumulations and distributions.

23. The method of claim 19, wherein the recommended portfolio determined by the portfolio optimization process is one that maximizes a utility function of the investor and takes into consideration a risk tolerance of the investor.

24. A method comprising:
one or more processors of one or more computer systems receiving information regarding each financial product of a set of financial products available to a particular investor for investment in a plurality of accounts of the particular investor having different tax treatment, the plurality of accounts including at least a taxable account and a tax-deferred account of the particular investor;
the one or more processors receiving information regarding an amount of wealth of the particular investor that is available for investment including information regarding current investments held in each financial product of the set of financial products and in which of the taxable account or the tax-deferred account the current investments are held;
the one or more processors programmatically determining one or more tax characteristics associated with each financial product of the set of financial products by evaluating one or more of information regarding distributions by the financial product and information regarding turnover associated with the financial product;
the one or more processors programmatically determining feasible exposures to a plurality of asset classes achievable by the particular investor by determining a combination of one or more asset classes of the plurality of asset classes and proportions thereof that characterize future performance of each financial product of the set of financial products;
the one or more processors programmatically determining a recommended portfolio of one or more financial products of the plurality of financial products and appropriate allocations among the one or more financial products by performing a portfolio optimization process that selects the one or more financial products for inclusion in the recommended portfolio by maximizing an expected utility of wealth for the particular investor taking into consideration the feasible exposures, the current investments, the one or more tax characteristics of each financial product of the set of financial products, one or more relevant financial circumstances of the investor, an actual amount of unrealized capital gains associated with each of the current investments, wherein the actual amount is positive for at least one investment of the current investments;
the one or more processors programmatically determining an account recommendation with respect to which of the taxable account and the tax deferred account each of the one or more financial products in the recommended portfolio should be held based on tax implications for the particular investor of holding the one or more financial products in the taxable account versus holding the one or more financial products in the tax deferred account; and
the one or more processors formulating advice for the particular investor based on the recommended portfolio and the account recommendation.

25. The method of claim 24, wherein the set of financial products includes stocks, bonds and mutual funds.

26. The method of claim 24, further comprising:
dividing the amount of wealth into a new money pool and an old money pool, the new money pool representing a portion of funds not previously invested, and the old money pool representing a portion of funds already invested; and
wherein said programmatically determining a recommended portfolio involves allocating wealth in the old money pool according to an old money strategy and allocating wealth in the new money pool according to a new money strategy.

27. The method of claim 24, wherein the portfolio optimization process adjusts returns for those of the set of financial products held in the taxable account to take into consideration expected tax effects for both accumulations and distributions.

28. The method of claim 24, wherein the plurality of accounts include one or more of a taxable brokerage account, an individual retirement account (IRA), an individual tax-advantaged account, an employer-sponsored account, a 401 (k) account and a 403(b) account.

29. A method comprising:
a step for receiving by one or more processors of one or more computer systems information regarding each financial product of a set of one or more financial products available for investment in a plurality of accounts of an investor having different tax treatment, the plurality of accounts including a taxable account and a tax deferred account;
a step for receiving by the one or more processors information regarding current investments held in the taxable account and the tax deferred account, including information regarding an actual amount of unrealized capital gains associated with each financial product that is part of the current investments held, wherein the actual amount is positive for at least one financial product that is part of the current investments held;
a step for determining by the one or more processors one or more tax characteristics associated with each financial product in the set of one or more financial products by evaluating one or more of information regarding distributions by the financial product and information regarding turnover associated with the financial product; and
a step for formulating advice by the one or more processors regarding a recommended portfolio of financial products from the set of one or more financial products, the advice including a recommendation with respect to which of the taxable account and the tax deferred account each financial product in the recommended portfolio should be held by performing a portfolio optimization process that selects the financial products for inclusion in the recommended portfolio based at least in part upon the information regarding the current investments, the one or more tax characteristics, one or more relevant financial circumstances of the investor and tax implications of holding the one or more financial products in the taxable account versus the tax deferred account.

30. A financial advisory system comprising:
a storage device having stored therein a portfolio optimization routine configured to select financial products from a plurality of financial products available to an investor for inclusion in a recommended portfolio; and
one or more processors coupled to the storage device configured to execute the portfolio optimization routine to formulate advice regarding the recommended portfolio based on information regarding current investments held in a taxable account of the investor and a tax deferred account of the investor, one or more tax characteristics associated with each financial product of the plurality of financial products, one or more relevant financial circumstances of the investor and tax implications of holding financial products of the plurality of financial products in the taxable account versus the tax deferred account, where:
the plurality of financial products is available for investment in a plurality of accounts of the investor having different tax treatment, including the taxable account and the tax deferred account;
the information regarding current investments held in the taxable account and the tax deferred account includes information regarding an actual amount of unrealized capital gains associated with each financial product that is part of the current investments held, wherein the actual amount is positive for at least one financial product that is part of the current investments held;
the one or more tax characteristics are determined by evaluating one or more of information regarding distributions by the financial product and information regarding turnover associated with the financial product; and
the advice includes a recommendation with respect to which of the taxable account and the tax deferred account each financial product in the recommended portfolio should be held.

31. A computer-readable storage medium tangibly embodying a set of instructions, which when executed by one or more processors of one or more computer systems, cause the one or more processors to:
receive information regarding each financial product of a set of one or more financial products available for investment in a plurality of accounts of an investor having different tax treatment, the plurality of accounts including a taxable account and a tax deferred account;
receive information regarding current investments held in the taxable account and the tax deferred account, including information regarding an actual amount of unrealized capital gains associated with each financial product that is part of the current investments held, wherein the actual amount is positive for at least one financial product that is part of the current investments held;
determine one or more tax characteristics associated with each financial product in the set of one or more financial products by evaluating one or more of information regarding distributions by the financial product and information regarding turnover associated with the financial product; and
formulate advice regarding a recommended portfolio of financial products from the set of one or more financial products, the advice including a recommendation with respect to which of the taxable account and the tax deferred account each financial product in the recommended portfolio should be held by performing a portfolio optimization process that selects the financial products for inclusion in the recommended portfolio based at least in part upon the information regarding the current investments, the one or more tax characteristics, one or more relevant financial circumstances of the investor and tax implications of holding the one or more financial products in the taxable account versus the tax deferred account.

32. A method comprising:
receiving, by one or more software modules, information regarding each financial product of a set of one or more financial products available for investment in a plurality of accounts of an investor having different tax treatment, the plurality of accounts including a taxable account and a tax deferred account;
receiving, by the one or more software modules, information regarding current investments held in the taxable account and the tax deferred account, including information regarding an actual amount of unrealized capital gains associated with each financial product that is part of the current investments held, wherein the actual amount is positive for at least one financial product that is part of the current investments held;
determining, by the one or more software modules, one or more tax characteristics associated with each financial product in the set of one or more financial products by evaluating one or more of information regarding distributions by the financial product and information regarding turnover associated with the financial product;
formulating advice, by the one or more software modules, regarding a recommended portfolio of financial products from the set of one or more financial products, the advice including a recommendation with respect to which of the taxable account and the tax deferred account each financial product in the recommended portfolio should be held by selecting the financial products for inclusion in the recommended portfolio based at least in part upon the information regarding the current investments, the one or more tax characteristics, one or more relevant financial circumstances of the investor and tax implications of holding the one or more financial products in the taxable account versus the tax deferred account; and
wherein the one or more software modules are implemented in one or more processors of one or more computer systems and one or more computer-readable storage media of the one or more computer systems, the one or more computer-readable storage media having instructions tangibly embodied therein representing the one or more software modules that are executable by the one or more processors.

33. The method of claim 32, wherein said determining, by the one or more software modules, one or more tax characteristics comprises assigning weights to each of a plurality of mutual funds of the set of one or more financial products available for investment by preferring mutual funds with a tax characteristic indicating tax efficiency and using the weights to divide wealth among the plurality of mutual funds.

34. The method of claim 32, wherein said determining, by the one or more software modules, one or more tax characteristics comprises:
estimating assets owned by a mutual fund of the set of one or more financial products available for investment based on historical fund performance; and
determining a tax characteristic of the mutual fund based on whether the estimated assets have a propensity to be taxed at a marginal tax rate or a long-term capital gains rate.

35. The method of claim 34, wherein said determining, by the one or more software modules, one or more tax characteristics comprises setting a tax characteristic to indicate low tax efficiency if the assets are estimated to comprise income-generating securities or dividend-paying equities.

36. The method of claim 32, wherein said determining, by the one or more software modules, one or more tax characteristics comprises:
   observing a turnover of a mutual fund of the set of one or more financial products available for investment; and
   setting a tax characteristic of the mutual fund based on the observation.

37. The method of claim 36, wherein said determining, by the one or more software modules, one or more tax characteristics comprises setting a tax characteristic to indicate low tax efficiency if the turnover is high.

38. The method of claim 32, wherein said determining, by the one or more software modules, one or more tax characteristics comprises:
   observing historical taxable distributions of a mutual fund of the set of one or more financial products available for investment; and
   determining a tax characteristic of the mutual fund based on the observation.

39. The method of claim 38, wherein said determining, by the one or more software modules, one or more tax characteristics comprises determining a tax characteristic to indicate low tax efficiency if the historical taxable distributions are high.

40. The method of claim 38, wherein the historical taxable distributions comprise dividends.

41. The method of claim 32, wherein a relevant financial circumstance of the one or more relevant financial circumstances comprises a marginal tax rate of the investor.

42. The method of claim 32, wherein at least one of the set of one or more financial products is a municipal bond mutual fund, and the one or more relevant financial circumstances include a marginal state tax rate of the investor.

43. The method of claim 33, further comprising placing wealth allocated to each mutual fund of the plurality of mutual funds into one or more of the plurality of accounts based on the tax treatment of the plurality of accounts.

44. The method of claim 43, wherein the plurality of accounts include one or more of a taxable brokerage account, an individual retirement account (IRA), an individual tax-advantaged account, an employer-sponsored account, a 401(k) account and a 403(b) account.

* * * * *